(12) United States Patent
Mizutani et al.

(10) Patent No.: US 8,343,252 B2
(45) Date of Patent: Jan. 1, 2013

(54) HONEYCOMB FILTER

(75) Inventors: Takashi Mizutani, Tokoname (JP); Shingo Iwasaki, Gifu (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/417,743

(22) Filed: Mar. 12, 2012

(65) Prior Publication Data

US 2012/0251398 A1 Oct. 4, 2012

(30) Foreign Application Priority Data

Mar. 30, 2011 (JP) ................................. 2011-075754

(51) Int. Cl.
 *B01D 39/00* (2006.01)
(52) U.S. Cl. ............ 55/522; 55/524; 422/122; 422/177; 422/178
(58) Field of Classification Search .................. 422/122, 422/169, 170, 171, 177, 178; 55/522, 523, 55/524, 488
See application file for complete search history.

(56) References Cited

U.S. PATENT DOCUMENTS

2007/0119135 A1 * 5/2007 Miao et al. ...................... 55/523
2010/0135866 A1 6/2010 Mizuno et al.

FOREIGN PATENT DOCUMENTS

JP 2010-142704 A1 7/2010
WO 2008/136232 A1 11/2008

* cited by examiner

*Primary Examiner* — Sean E Conley
(74) *Attorney, Agent, or Firm* — Burr & Brown

(57) ABSTRACT

A honeycomb filter 20 includes a plurality of porous partition portions 22 forming a plurality of cells 23 serving as channels of fluid and trapping layers 24 that are formed on the partition portions and configured to trap a solid component contained in the fluid. In the honeycomb filter 20, a predetermined trapping region present on the partition portions 22 satisfies that, in an inscribed-circle-diameter distribution obtained by dividing an image of the partition portions captured with an electron microscope into a material region and a plurality of pore regions and by drawing maximum inscribed circles individually inscribed in the pore regions, a median pore diameter D50 is 1 μm or more and 6 μm or less and a median pore diameter D80 is 1 μm or more and 7 μm or less, and an inscribed-circle porosity determined from the inscribed-circle-diameter distribution is 35% or more and 60% or less.

8 Claims, 10 Drawing Sheets

Diameter of maximum inscribed circle/ μ m

<Partition>

<Upstream region>

<Downstream region>

<Partition> <Partition + Trapping layer>

<Material region + Pore region>

<Maximum inscribed circle>

Median pore diameter D80 in the inscribed-circle-diameter distribution / μm

Inscriber-circle porpsity / %

HONEYCOMB FILTER

BACKGROUND OF THE INVENTION

1. Field of the Invention

The present invention relates to a honeycomb filter.

2. Background Art

A honeycomb filter has been proposed that has cell partitions arranged in the form of a honeycomb and a large number of cells sectioned by the cell partitions, wherein the ratio of the presence of open pores that are open in the surfaces of the cell partitions within the distance of 20 μm from the surfaces of the cell partitions in the depth direction is 7% or more (for example, refer to Patent Literature 1). It is stated that this filter can have a high resistance to separation of a loaded catalyst. Another honeycomb filter has been proposed that has partitions having porous partition bases and surface layers provided on the inflow sides of the partition bases, wherein conditions including the peak pore diameter of the surface layers, the porosity of the surface layers, the thickness of the surface layers, the mass of the surface layers per filtration area, and the average pore diameter of the partition bases are properly adjusted (for example, refer to Patent Literature 2). In this filter, a rapid increase in the pressure loss immediately after the initiation of trapping of particulate matter (PM) is not caused and the relationship between the amount of PM deposited and the pressure loss does not have hysteresis characteristics. Thus, the pressure loss in an initial state where PM is not deposited can be suppressed to a low value.

CITATION LIST

Patent Literature

[PTL 1] Japanese Unexamined Patent Application Publication No. 2010-142704
[PTL 2] WO2008/136232

SUMMARY OF INVENTION

In the honeycomb filter described in Patent Literature 1, the size of open pores in the surfaces of the partitions is increased to thereby suppress an increase in the pressure loss upon deposition of a catalyst; however, the only improvement in the partitions is not satisfactory and there is a problem that soot enters the open pores and the pressure loss upon deposition of soot considerably increases. In the honeycomb filter described in Patent Literature 2, an increase in the pressure loss can be suppressed; however, an additional improvement of, for example, further suppressing an increase in the pressure loss particularly in the case of entry of soot in pores at a high flow rate has been demanded.

The present invention has been accomplished under these circumstances. A main object of the present invention is to provide a honeycomb filter having an enhanced performance of trapping solid components contained in fluid.

Accordingly, a honeycomb filter according to the present invention includes a plurality of porous partition portions forming a plurality of cells serving as channels of fluid; and trapping layers that are formed on the partition portions and configured to trap a solid component contained in the fluid, wherein a predetermined trapping region present on the partition portions satisfies that, in an inscribed-circle-diameter distribution obtained by dividing an image of the partition portions captured with an electron microscope into a material region and a plurality of pore regions and by drawing maximum inscribed circles individually inscribed in the pore regions, a median pore diameter D50 is 1 μm or more and 6 μm or less and a median pore diameter D80 is 1 μm or more and 7 μm or less, and an inscribed-circle porosity determined from the inscribed-circle-diameter distribution is 35% or more and 60% or less.

This honeycomb filter has an enhanced performance of trapping solid components contained in fluid. This is probably achieved by the following reasons. For example, median pore diameters D50 and D80 in an inscribed-circle-diameter distribution in partition portions can be obtained with maximum inscribed circles individually inscribed in a plurality of pore regions in an image of the partition portions captured with an electron microscope. When the median pore diameter D50 in the inscribed-circle-diameter distribution is 1 μm or more, the permeability of the trapping layers is high and the pressure loss is considerably reduced. When the median pore diameter D50 is 6 μm or less, in particular, under a high load causing a high flow rate, solid components (PM) are less likely to pass through open pores in the trapping layers and deposition of solid components in the pores in the partitions can be suppressed; thus, an increase in the pressure loss can be further suppressed. When the median pore diameter D80 is 1 μm or more, the permeability of the trapping layers is high and the pressure loss is considerably reduced. When the median pore diameter D80 is 7 μm or less, in particular, under a high load causing a high flow rate, solid components are less likely to pass through open pores in the trapping layers and deposition of solid components in the pores in the partitions can be suppressed; thus, an increase in the pressure loss can be further suppressed. When the inscribed-circle porosity determined from the inscribed-circle-diameter distribution is 35% or more, an increase in the permeation resistance is further suppressed and the pressure loss is further reduced. When the inscribed-circle porosity is 60% or less, the trapping performance of the trapping layers is sufficiently provided to suppress passing of solid components through the trapping layers and further enhance the trapping efficiency. Thus, the performance of trapping solid components contained in fluid can be further enhanced.

In a honeycomb filter according to the present invention, the predetermined trapping region may further satisfy 0.1<D50/D80<1. When D50/D80 is more than 0.1, an increase in the pressure loss due to an increase in the closed pores can be suppressed. The ratio D50/D80 of the median pore diameter D50 to the median pore diameter D80 satisfies 1 or less.

A honeycomb filter according to the present invention may satisfy the following conditions: in the partition portions, the predetermined trapping region extends from a downstream end surface of the honeycomb filter and has a length that is at least 20% of an entire length of the honeycomb filter; and the predetermined trapping region extends from the downstream end surface and has a length that is 50% or less of the entire length of the honeycomb filter. Specifically, a region extending from the downstream end surface to a portion that is away from the downstream end surface by 20% of the entire length may be defined, at the minimum, as the predetermined trapping region; and a region extending from the downstream end surface to a portion that is away from the downstream end surface by 50% of the entire length may be defined, at the maximum, as the predetermined trapping region. When the trapping region extends from the downstream end surface and has a length that is at least 20% of the entire length of the honeycomb filter, solid components can be reliably trapped by the trapping layers, deposition of solid components in partition pores can be further suppressed, and an increase in the pressure loss can be further suppressed. When the trapping region extends from the downstream end surface and has a length that is 50% or less of the entire length, for example, in loading with a catalyst, the catalyst slurry can sufficiently permeate the upstream region of the honeycomb filter; thus, agglomeration of the catalyst within the trapping layers and in the interfacial portions between the trapping layers and the partitions can be further suppressed, and an increase in the pressure loss can be further suppressed.

In a honeycomb filter according to the present invention, a region in which an inscribed-circle porosity determined from the inscribed-circle-diameter distribution is 15% or more and 40% or less is preferably present in an upstream region that extends from an upstream end surface of the honeycomb filter and has a length that is 20% or less of an entire length of the honeycomb filter. When the inscribed-circle porosity in the upstream region is 15% or more, an increase in the permeation resistance is further suppressed and the pressure loss is further reduced. When the inscribed-circle porosity in the upstream region is 40% or less, the trapping performance of the trapping layers can be sufficiently provided; the passing of solid components through the trapping layers is suppressed and the trapping efficiency can be enhanced. In this case, the inscribed-circle porosity determined from the inscribed-circle-diameter distribution in the upstream region is preferably smaller than the inscribed-circle porosity determined from the inscribed-circle-diameter distribution in the predetermined trapping region. As a result, fluid can be made to flow more suitably from the upstream region to the predetermined trapping region.

In a honeycomb filter according to the present invention, the trapping layers may be formed by supplying an inorganic material serving as a raw material of the trapping layers to the cells with a gas serving as a transport medium. In this case, by using transportation with the gas, the formation state of the trapping layers such as the thickness of the trapping layers can be relatively easily controlled.

In a honeycomb filter according to the present invention, the partition portions may be formed so as to contain one or more inorganic materials selected from cordierite, SiC, mullite, aluminum titanate, alumina, silicon nitride, SIALON, zirconium phosphate, zirconia, titania, and silica. The trapping layers may be formed so as to contain one or more inorganic materials selected from cordierite, SiC, mullite, aluminum titanate, alumina, silicon nitride, SIALON, zirconium phosphate, zirconia, titania, and silica. In this case, the trapping layers are preferably formed of a material of the same type as that of a material of the partition portions.

In a honeycomb filter according to the present invention, the honeycomb filter may include two or more honeycomb segments bonded together with a bonding layer, the honeycomb segments including the partition portions and the trapping layers. In this case, by the bonding with the bonding layer, the mechanical strength of the honeycomb filter can be enhanced. Alternatively, a honeycomb filter according to the present invention may be an integrally formed product. In this case, the configuration is simplified and the honeycomb filter can be readily produced.

A honeycomb filter according to the present invention may be loaded with a catalyst. In this case, for example, removal of trapped solid components by combustion can be more efficiently performed.

DESCRIPTION OF THE PREFERRED EMBODIMENTS

Figure 1:
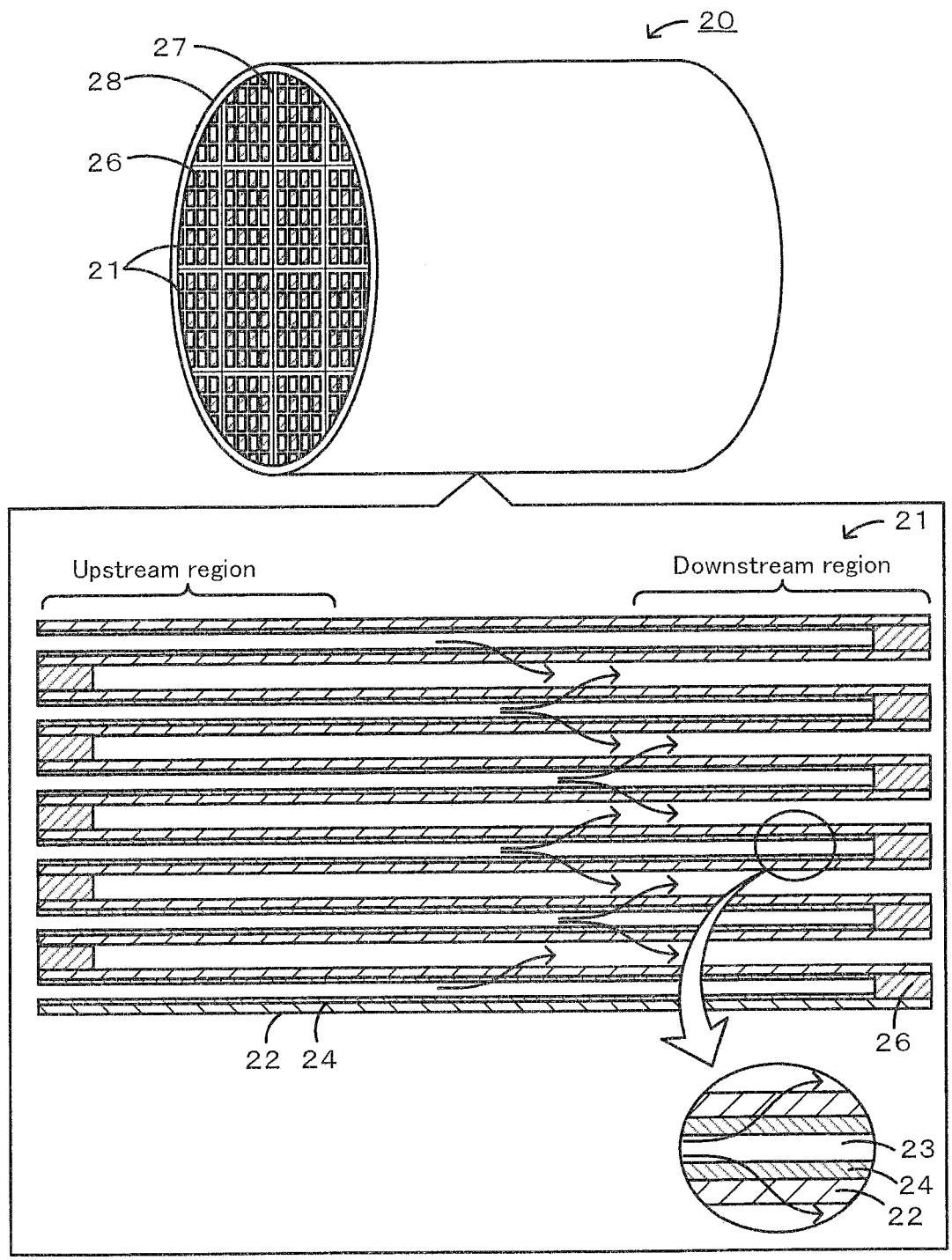
FIG. 1 is an explanatory view illustrating a schematic example of the configuration of a honeycomb filter 20.
Figure 2:
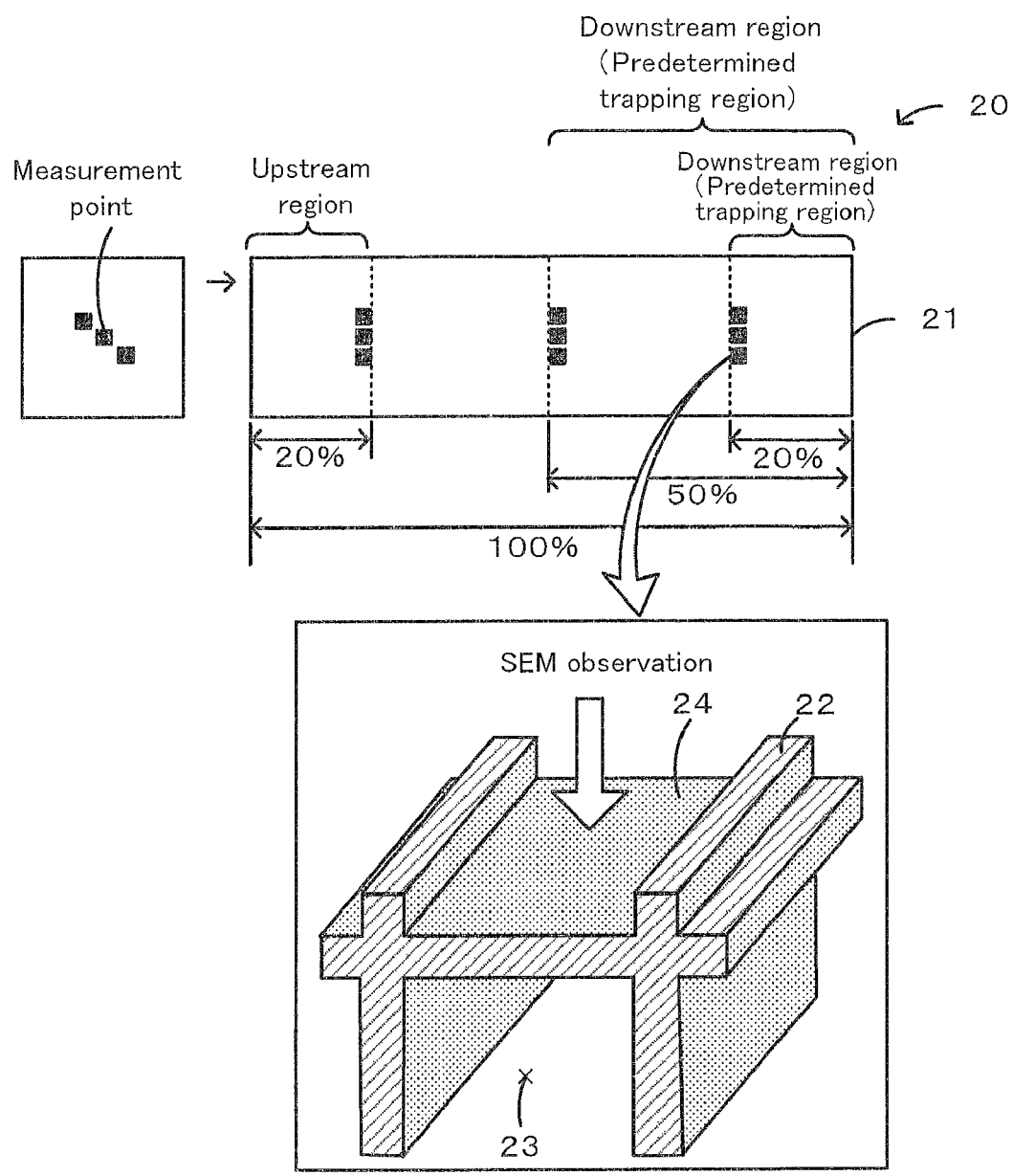
FIG. 2 is an explanatory view illustrating measurement points of the pore distributions of trapping layers 24.
Figure 3:
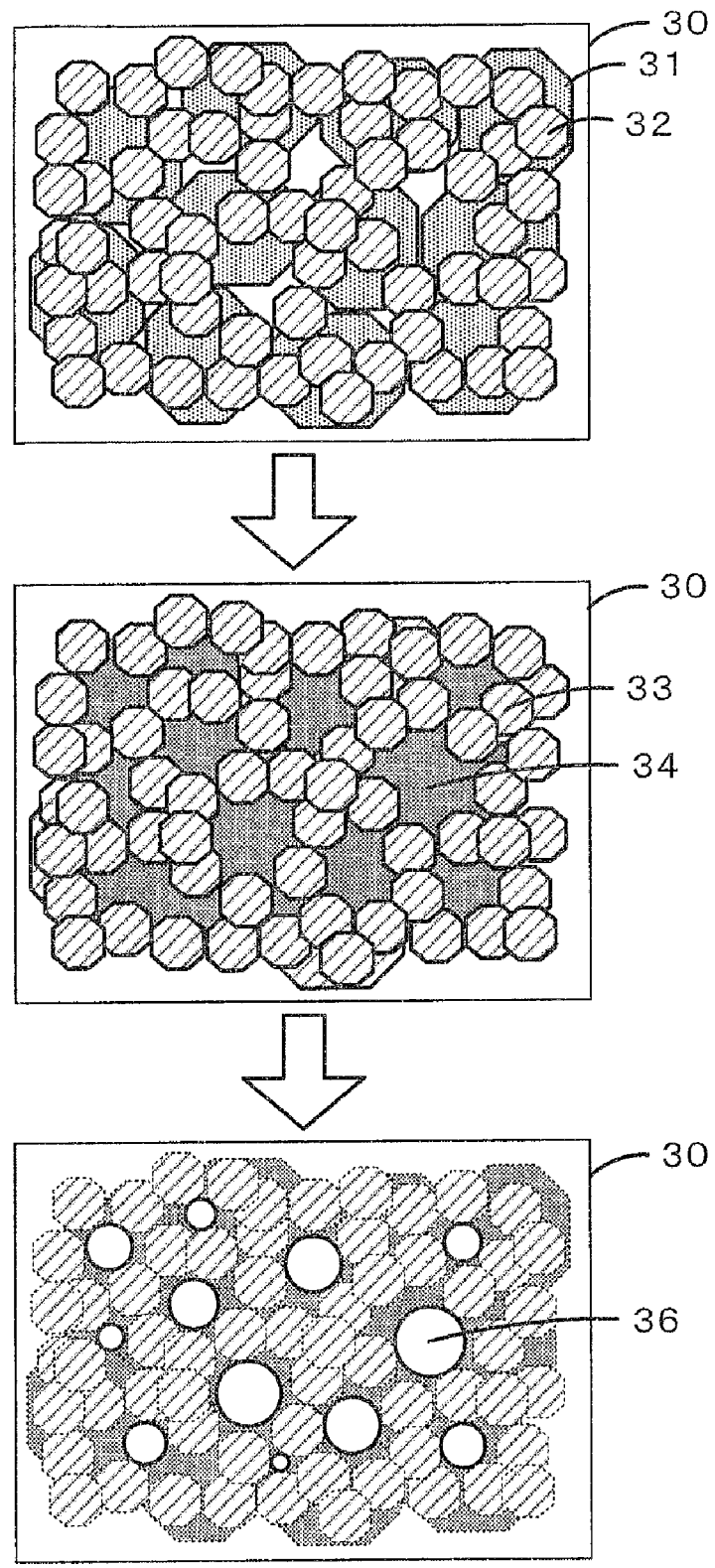
FIG. 3 is an explanatory view illustrating the process of calculating a pore distribution in a trapping layer with a SEM image.
Figure 4:
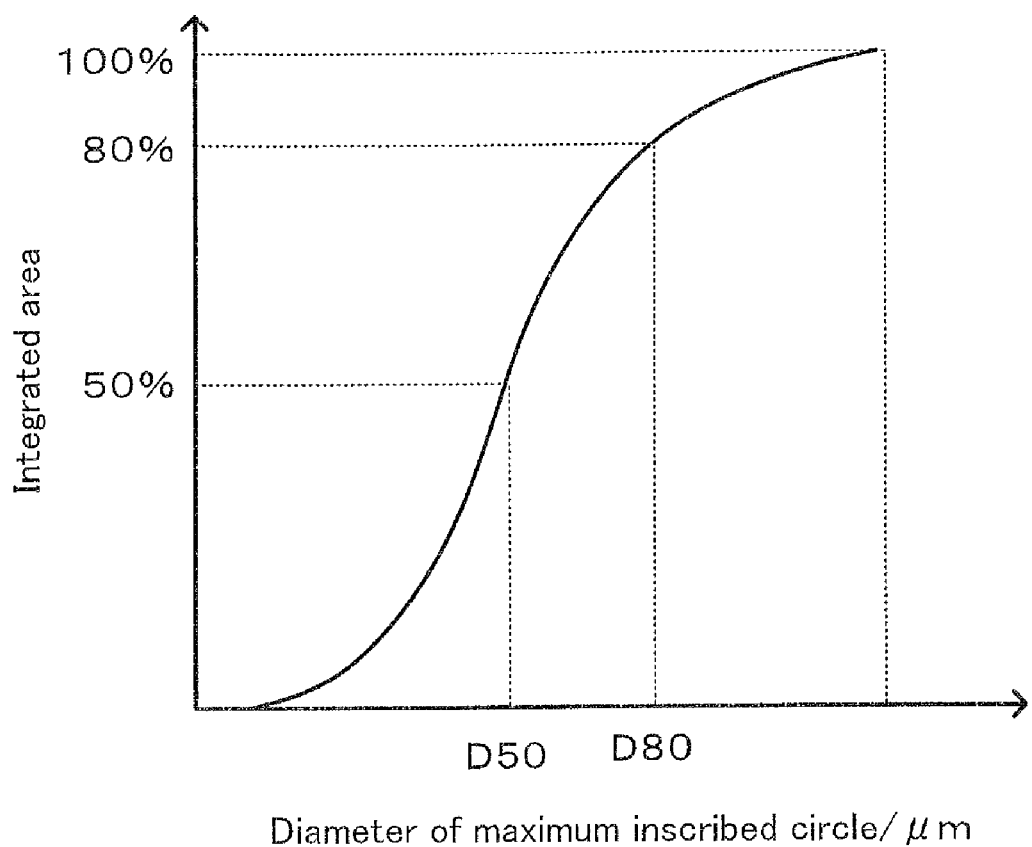
FIG. 4 is a graph in terms of the diameter of the maximum inscribed circles and the integrated area of the maximum inscribed circles.

A honeycomb filter according to an embodiment of the present invention will be described with reference to drawings. FIG. 1 is an explanatory view illustrating a schematic example of the configuration of a honeycomb filter 20 according to an embodiment of the present invention. FIG. 2 is an explanatory view illustrating measurement points of the pore distributions of trapping layers 24. FIG. 3 is an explanatory view illustrating the process of calculating a pore distribution in a trapping layer with a SEM image. FIG. 4 is a graph in terms of the diameter of the maximum inscribed circles and the integrated area of the maximum inscribed circles. As illustrated in FIG. 1, in the honeycomb filter 20 according to the embodiment, a structure in which two or more honeycomb segments 21 having partition portions 22 are bonded together with bonding layers 27 is formed, and a circumferential protective portion 28 is formed around the structure. FIG. 1 illustrates an example in which the honeycomb filter 20 has a cylindrical outer shape, the honeycomb segments 21 have a rectangular prism outer shape, and cells 23 have a rectangular shape. The honeycomb filter 20 includes the porous partition portions 22 forming the plurality of cells 23 that each have one end open and the other end sealed with a sealing portion 26 and that function as channels of exhaust gas as fluid; and the trapping layers 24 formed on the partition portions 22 and configured to trap solid components (PM) contained in the fluid (exhaust gas). In the honeycomb filter 20, the partition portions 22 are formed such that a cell 23 that has one end open and the other end sealed and a cell 23 that has one end sealed and the other end open are alternately arranged. In the honeycomb filter 20, exhaust gas having entered the cells 23 on the entry side passes through the trapping layers 24 and the partition portions 22 and is discharged from the cells 23 on the exit side; during this process, PM contained in the exhaust gas is trapped onto the trapping layers 24.

The partition portions 22 are formed so as to have a thickness, that is, a partition thickness of 150 or more and 460 μm or less, more preferably 200 μm or more and 400 μm or less, still more preferably 280 μm or more and 350 μm or less. The partition portions 22 are porous and, for example, may be formed so as to contain one or more inorganic materials selected from cordierite, Si-bonded SiC, recrystallized SiC, aluminum titanate, mullite, silicon nitride, SIALON, zirconium phosphate, zirconia, titania, alumina, and silica. Of these, for example, cordierite, Si-bonded SiC, and recrystallized SiC are preferred. The partition portions 22 preferably have a porosity of 30 vol % or more and 85 vol % or less, more preferably 35 vol % or more and 65 vol % or less. The partition portions 22 preferably have an average pore diameter in the range of 10 μm or more and 60 μm or less. The porosity and the average pore diameter of the partition portions 22 denote measurement results obtained by mercury porosimetry. When the partition portions 22 are formed so as to have such a porosity, an average pore diameter, and a thickness, exhaust gas readily passes the partition portions 22 and PM is readily trapped and removed.

The trapping layers 24, which are configured to trap and remove PM contained in exhaust gas, may be formed of, on the partition portions 22, a particle group having an average particle size smaller than the average pore diameter of the partition portions 22. The raw-material particles forming the trapping layers 24 preferably have an average particle size of 0.5 μm or more and 15 μm or less. When the average particle size is 0.5 μm or more, the space between the particles forming the trapping layers can have a sufficiently large size and hence the permeability of the trapping layers can be maintained and a rapid increase in the pressure loss can be suppressed. When the average particle size is 15 μm or less, the particles have a sufficiently large number of contact points between the particles and hence a sufficiently high bonding strength between the particles can be achieved and the trapping layers can have a sufficiently high peel strength. The trapping layers 24 may be formed on the partition portions 22 of the exhaust-gas-entry-side cells and the exhaust-gas-exit-side cells. However, as illustrated in FIG. 1, the trapping layers 24 are preferably formed on the partition portions 22 of the entry-side cells and not in the exit-side cells. In this case, the pressure loss can be further decreased and PM contained in fluid can be more efficiently removed. In addition, the production of the honeycomb filter 20 is facilitated. The trapping layers 24 may be formed so as to contain one or more inorganic materials selected from cordierite, SiC, mullite, aluminum titanate, alumina, silicon nitride, SIALON, zirconium phosphate, zirconia, titania, and silica. In this case, the trapping layers 24 are preferably formed of a material of the same type as that of a material of the partition portions 22. The average particle size of the raw-material particles denotes the median diameter (D50) of the raw-material particles measured with a laser diffraction/scattering particle size distribution analyzer and with water serving as a dispersion medium. The trapping layers 24 formed of a particle group of an inorganic material may be formed as uniform layers over the surfaces of the partition portions 22 or as partial layers on the surfaces of the partition portions 22.

In the honeycomb filter 20, a predetermined trapping region is present on the partition portions 22; in the predetermined trapping region, in an inscribed-circle-diameter distribution obtained by dividing an image (SEM image) of the partition portions captured with an electron microscope into a material region and a plurality of pore regions and drawing maximum inscribed circles individually inscribed in the pore regions, a median pore diameter D50 is 1 μm or more and 6 μm or less and a median pore diameter D80 is 1 μm or more and 7 μm or less. When the median pore diameter D50 in the inscribed-circle-diameter distribution is 1 μm or more, the permeability of the trapping layers 24 is high and the pressure loss can be reduced. When the median pore diameter D50 is 6 μm or less, in particular, under a high load causing a high flow rate, PM is less likely to pass through open pores in the trapping layers and deposition of PM in the pores in the partitions can be suppressed; thus, an increase in the pressure loss can be further suppressed. When the median pore diameter D80 is 1 μm or more, the permeability of the trapping layers is high and the pressure loss is considerably reduced. When the median pore diameter D80 is 7 μm or less, in particular, under a high load causing a high flow rate, PM is less likely to pass through open pores in the trapping layers and deposition of PM in the pores in the partitions can be suppressed; thus, an increase in the pressure loss can be further suppressed. The predetermined trapping region is preferably a downstream region of the honeycomb filter 20. In this case, PM can be more reliably trapped.

The honeycomb filter 20 includes the predetermined trapping region having an inscribed-circle porosity of 35% or more and 60% or less, the inscribed-circle porosity being determined from the inscribed-circle-diameter distribution obtained by dividing a SEM image into a material region and a plurality of pore regions and drawing maximum inscribed circles individually inscribed in the pore regions. When the inscribed-circle porosity determined from the inscribed-circle-diameter distribution is 35% or more, an increase in the permeation resistance is further suppressed and the pressure loss is further reduced. When the inscribed-circle porosity is 60% or less, the trapping performance of the trapping layers is sufficiently provided to suppress passing of PM through the trapping layers and further enhance the trapping efficiency. Thus, the performance of trapping solid components contained in fluid can be further enhanced.

In the honeycomb filter 20, when the ratio of the median pore diameter D50 to the median pore diameter D80 is defined as D50/D80, the predetermined trapping region may satisfy 0.1<D50/D80<1. When D50/D80 is more than 0.1, an increase in the pressure loss due to an increase in the closed pores can be suppressed. More preferably, 0.15 D50/D80≦0.60 is satisfied. In this case, the pressure loss can be further reduced. The ratio D50/D80 of the median pore diameter D50 to the median pore diameter D80 satisfies 1 or less.

In the honeycomb filter 20, in the partition portions 22, the predetermined trapping region may extend from the downstream end surface of the honeycomb filter and have a length that is at least 20% of the entire length of the honeycomb filter; and the predetermined trapping region may extend from the downstream end surface and have a length that is 50% or less of the entire length of the honeycomb filter. Specifically, a region extending from the downstream end surface to a portion that is away from the downstream end surface by 20% of the entire length may be defined, at the minimum, as the predetermined trapping region; and a region extending from the downstream end surface to a portion that is away from the downstream end surface by 50% of the entire length may be defined, at the maximum, as the predetermined trapping region. When the predetermined trapping region extends from the downstream end surface and has a length that is at least 20% of the entire length of the honeycomb filter, PM can be reliably trapped by the trapping layers, deposition of PM in partition pores can be further suppressed, and an increase in the pressure loss can be further suppressed. When the predetermined trapping region extends from the downstream end surface and has a length that is 50% or less of the entire length, for example, in loading with a catalyst, the catalyst slurry can sufficiently permeate the upstream region of the honeycomb filter; thus, agglomeration of the catalyst within the trapping layers and in the interfacial portions between the trapping layers and the partitions can be further suppressed, and an increase in the pressure loss can be further suppressed. In summary, the "predetermined trapping region" is preferably present in the downstream region of the honeycomb filter 20.

In the honeycomb filter 20, in an upstream region that extends from the upstream end surface of the honeycomb filter 20 and has a length that is 20% or less of the entire length of the honeycomb filter 20, an inscribed-circle porosity determined from an inscribed-circle-diameter distribution is preferably 15% or more and 40% or less. When the inscribed-circle porosity in the upstream region is 15% or more, an increase in the permeation resistance is further suppressed and the pressure loss is further reduced. When the inscribed-circle porosity in the upstream region is 40% or less, the trapping performance of the trapping layers can be sufficiently provided; the passing of PM through the trapping layers is suppressed and the trapping efficiency can be enhanced. In this case, the inscribed-circle porosity determined from the inscribed-circle-diameter distribution in the upstream region is preferably smaller than the inscribed-circle porosity determined from the inscribed-circle-diameter distribution in the predetermined trapping region. As a result, fluid can be made to flow more suitably from the upstream region to the predetermined trapping region.

Herein, the median pore diameters D50 and D80 in the inscribed-circle-diameter distribution and the inscribed-circle porosity in the inscribed-circle-diameter distribution will be described in detail. It is difficult to determine the pore distribution, specific surface, and the like of the trapping layers 24 formed on the partition portions 22 even by gas absorption measurement, mercury porosimetry, or the like. Herein, SEM images of the partitions are captured and the captured SEM images are analyzed to determine the pore diameter and porosity mainly in the trapping layers 24. As illustrated in the upper portion of FIG. 2, specimens for SEM-image capturing are prepared in the following manner. The honeycomb filter 20 is cut to provide a cross section, at a portion (the predetermined trapping region) that is away from the downstream end surface of the honeycomb filter 20 by a certain proportion of the entire length of the honeycomb filter 20. Three observation specimens having sides of about 1 cm are cut from the central portion of the cross section and polished. The portion that is away from the downstream end surface by a certain proportion of the entire length is a region that is away from the downstream end surface by 20% to 50% of the entire length, mainly, 35% of the entire length. In the upstream region, the honeycomb filter 20 is cut to provide a cross section, at a portion that is away from the upstream end surface of the honeycomb filter 20 by 20% of the entire length of the honeycomb filter 20. Three observation specimens having sides of about 1 cm are cut from the central portion of the cross section and polished. As illustrated in the lower portion of FIG. 2, the specimens are cut in a plane horizontal to the partition portions 22. As a result, the trapping layers 24 formed on the surfaces of the partition portions 22 are easily observed. SEM images of five fields of view randomly selected from the surfaces of the partition portions 22 of the sampled specimens are captured (refer to the upper portion of FIG. 3). The upper portion of FIG. 3 illustrates a SEM image 30 in which trapping-layer particles 32 are formed on partition-portion particles 31. The SEM images are captured at a magnification of 1,000 times and saved as images of 1024×960 pixels. In total, 15 SEM images are captured from five fields of view in terms of three specimens sampled. The SEM images are subjected to image analysis to measure median pore diameters and porosity. The averages of the measured values are defined as values in the predetermined trapping region (downstream region). Herein, a median pore diameter D50 (μm) determined from the inscribed-circle-diameter distribution of the trapping layers, a median pore diameter D80 (μm) of the trapping layers, and an inscribed-circle porosity (area %) of the trapping layers are determined. The image analysis method will be described below. As for the upstream region, in the same manner as in the downstream region, observation specimens are obtained and observed with a SEM and the inscribed-circle porosity (area %) of the trapping layers is determined from the obtained SEM images. In the capture of the SEM images, the contrast and the brightness are preferably in the ranges of contrast and brightness recommended for the scanning electron microscope. As a result, in binarization of image analysis described below, the influence in SEM images can be further reduced.

An image captured from the partition portion with an electron microscope is divided into a material region and a plurality of pore regions. An inscribed-circle-diameter distribution is obtained with maximum inscribed circles individually inscribed in the pore regions. From the inscribed-circle-diameter distribution, the median pore diameter D50, the median pore diameter D80, and the inscribed-circle porosity are determined. As illustrated in the middle portion of FIG. 3, the SEM image 30 is subjected to binarization with image analysis software so as to be divided into a material region 33 and pore regions 34. The threshold brightness serving as a boundary in binarization into the material region 33 and the pore regions 34 by image analysis is the 10th level among 0 to 255 brightness levels classified in 8 bits. Since the SEM image is a monochrome image, areas in which any one of RGB values is "10" or more in the 0-255 brightness level are set as the material region and areas in which the RGB values are less than "10" are set as the pore regions. When the threshold is less than "10", the influences of small gaps other than pores between the particles, blurring of the image, and the like are strongly detected and hence it becomes difficult to properly evaluate the forms of the pores. When the threshold is more than "10", particularly in the cases of forming trapping layers, it becomes harder to sufficiently detect particles between pores and the pores tend to be recognized as a continuous single pore. Accordingly, the threshold is preferably "10". Among the pore regions determined by binarization, regions having a size of less than 50 pixels are excluded because they are considerably influenced by dust in SEM-image capture, slight cracking caused during polishing of resin, or the like; and regions having a size of 50 or more pixels are defined as the pore regions. As illustrated in the lower portion of FIG. 3, maximum inscribed circles 36 are drawn so as to be individually inscribed in the plurality of pore regions 34 in the SEM image 30. The diameter, number, and the like of the maximum inscribed circles 36 are determined. Although the pore regions have various shapes, a single maximum inscribed circle 36 is drawn for each region.

As illustrated in FIG. 4, the diameter of the maximum inscribed circles is plotted on the abscissa axis and the integrated area of the maximum inscribed circles is plotted on the ordinate axis. From this distribution, the median pore diameters D50 and D80 in the inscribed-circle-diameter distribution can be calculated. The proportion of the integrated area of the maximum inscribed circles with respect to the total area of the observed fields of view can be defined as the inscribed-circle porosity (area %).

The trapping layers 24 may be formed by using fluid as a transport medium of the raw material of the trapping layers and supplying a gas containing the raw material of the trapping layers to entry cells. In this case, the particle group forming the trapping layers can be formed as a coarse particle group and hence trapping layers having a high porosity can be formed, which is preferable. The fluid serving as the transport medium is preferably a gas such as the air or nitrogen gas. The raw material of the trapping layers may be, for example, inorganic fibers or inorganic particles. The inorganic fibers may be composed of the above-described inorganic materials and, for example, preferably have an average particle size of 0.5 μm or more and 8 μm or less and have an average length of 100 or more and 500 μm or less. The inorganic particles may be composed of the above-described inorganic materials. For example, SiC particles or cordierite particles having an average particle size of 0.5 μm or more and 15 μm or less may be used. The raw material of the trapping layers preferably has an average particle size smaller than the average pore diameter of the partition portions 22. Herein, the inorganic materials of the partition portions 22 and the trapping layers 24 are preferably of the same type. When a gas containing inorganic particles is made to flow into the entry, the gas is preferably suctioned from the exit of the gas. In the formation of the trapping layers 24, a binder may be supplied together with inorganic fibers or inorganic particles. The binder may be selected from sol materials and colloid materials and is preferably, in particular, colloidal silica. It is preferred that the inorganic particles be covered with silica and bonded together with silica and that the inorganic particles and the material of the partition portions be bonded together with silica. For example, when an oxide material such as cordierite or aluminum titanate is used, it is preferred that the inorganic particles be bonded together by sintering and that the inorganic particles and the material of the partition portions be bonded together by sintering. The trapping layers 24 are preferably formed by forming layers of a raw material on the partition portions 22 and subsequently performing a heat treatment to achieve the bonding. The temperature of the heat treatment is preferably, for example, 650° C. or more and 1350° C. or less. When the heat treatment temperature is 650° C. or more, a sufficiently high bonding strength can be achieved. When the heat treatment temperature is 1350° C. or less, clogging of pores due to excessive oxidation of particles can be suppressed. Alternatively, for example, the trapping layers 24 may be formed on the surfaces of the cells 23 with a slurry containing inorganic particles serving as a raw material of the trapping layers 24.

In the trapping layers 24 formed with fluid (air) serving as a transport medium of the raw material of the trapping layers, the median pore diameters D50 and D80 in the inscribed-circle-diameter distribution and the inscribed-circle porosity in the inscribed-circle-diameter distribution can be controlled by properly setting conditions including the average particle size and particle size distribution of the raw material of the trapping layers, the feed rate of the raw material of the trapping layers, and the flow rate of the fluid. By making predetermined regions of the partition portions 22 such as the upstream and downstream regions of the honeycomb segments 21 contain alcohol, water, a resin, or the like to increase the permeation resistance to the fluid, regions where the raw-material particles of the trapping layers that are fed are deposited can be controlled. For example, by making the average particle size of the raw-material particles of the trapping layers be 2.3 μm to 10 μm, by making the sharpness index Ds of the particle size distribution of the raw-material particles of the trapping layers be 0.7 to 1.8, or by making the flow rate of the fluid be 160 L/min to 720 L/min, the value of the inscribed-circle-diameter distribution can be varied. Herein, the sharpness index Ds indicates the sharpness of the particle size distribution of the raw material of the trapping layers, the raw material having a predetermined average particle size (for example, 5 μm). The sharpness index Ds is defined as being calculated with Ds=D50/(D90−D10) where the median diameters D10, D50, and D90 of the raw-material powder are measured by a laser diffraction/scattering particle size distribution analyzer.

The bonding layers 27 are used to bond the honeycomb segments 21 together and may contain inorganic particles, inorganic fibers, a binder, and the like. The inorganic particles may be particles of the above-described inorganic, materials and preferably have an average particle size of 0.1 μm or more and 30 μm or less. For example, the inorganic fibers may be formed so as to contain one or more materials selected from aluminosilicate, alumina, silica, zirconia, ceria, and mullite. For example, the inorganic fibers preferably have an average particle size of 0.5 μm or more and 8 μm or less and an average length of 100 μm or more and 500 μm or less. The binder may be colloidal silica, clay, or the like. The bonding layers 27 are preferably formed so as to have a thickness of 0.5 mm or more and 2 mm or less. The circumferential protective portion 28 is used to protect the circumference of the honeycomb filter 20 and may contain the above-described inorganic particles, inorganic fibers, binder, and the like.

In the honeycomb filter 20, the thermal expansion coefficient of the cells 23 in the channel direction at 40° C. to 800° C. is preferably $6.0 \times 10^{-6}$/° C. or less, more preferably $1.0 \times 10^{-6}$/° C. or less, still more preferably $0.8 \times 10^{-6}$/° C. or less. When the thermal expansion coefficient is $6.0 \times 10^{-6}$/° C. or less, thermal stress generated upon exposure to a high-temperature exhaust gas can be suppressed within the allowable range.

The outer shape of the honeycomb filter 20 is not particularly limited and may be a cylindrical shape, a rectangular prism shape, an elliptic cylindrical shape, a hexagonal prism shape, or the like. The outer shape of the honeycomb segments 21 is not particularly limited and the honeycomb segments 21 preferably have planar surfaces suitable for bonding together. The honeycomb segments 21 may have a prism shape whose cross section has a polygonal shape (a rectangular prism shape, a hexagonal prism shape, or the like). The cross section of the cells may have a shape of a polygon such as a triangle, a quadrangle, a hexagon, or an octagon; a streamline shape such as a circular shape or an elliptic shape; or the shape of a combination of the foregoing. For example, the cells 23 may be formed so as to have a quadrangular cross section perpendicular to the direction in which exhaust gas flows.

In the honeycomb filter 20, the cell pitch is preferably 1.0 mm or more and 2.5 mm or less. The larger the filtration area is, the smaller the pressure loss upon the deposition of PM becomes. On the other hand, the smaller the cell diameter is, the larger the initial pressure loss becomes. Accordingly, the cell pitch, the cell density, and the thickness of the partition portions 22 are preferably determined in consideration of the tradeoff relationship relating to the initial pressure loss, the pressure loss upon the deposition of PM, and the trapping efficiency of PM.

The honeycomb filter 20 may be loaded with a catalyst. This catalyst may be at least one of catalysts for promoting combustion of trapped PM, catalysts for oxidizing unburned gas (HCs, CO, and the like) contained in exhaust gas, and catalysts for storing/absorbing/decomposing NOx. In this case, for example, PM can be efficiently removed; unburned gas can be efficiently oxidized; or NOx can be efficiently decomposed. For example, such a catalyst preferably contains one or more of noble metal elements and transition metal elements. The honeycomb filter 20 may be loaded with another catalyst or another cleaning agent: for example, a NOx storage catalyst containing an alkali metal (Li, Na, K, Cs, or the like) or an alkaline-earth metal (Ca, Ba, Sr, or the like), at least one rare-earth metal, a transition metal, a three-way catalyst, a promoter exemplified by cerium (Ce) oxide and/or zirconium (Zr) oxide, or a HC (hydrocarbon) adsorbent. Specifically, examples of the noble metal include platinum (Pt), palladium (Pd), rhodium (Rh), gold (Au), and silver (Ag). Examples of the transition metal contained in the catalyst include Mn, Fe, Co, Ni, Cu, Zn, Sc, T, V, and Cr. Examples of the rare-earth metal include Sm, Gd, Nd, Y, La, and Pr. Examples of the alkaline-earth metal include Mg, Ca, Sr, and Ba. Of these, platinum and palladium are preferred. Such a noble metal, a transition metal, a promoter, or the like may be loaded in a carrier having a large specific surface. Examples of the carrier include alumina, silica, silica alumina, and zeolite. When a catalyst for promoting combustion of PM is loaded, PM trapped on the trapping layers 24 can be more readily removed. When a catalyst for oxidizing unburned gas or a catalyst for decomposing NOx is loaded, exhaust gas can be further cleaned.

In the honeycomb filter 20 according to the above-described embodiment, the median pore diameters D50 and D80, the inscribed-circle porosity, and the like in the inscribed-circle-diameter distribution in the trapping layers 24 formed on the partition portions 22 are made to satisfy suitable ranges to thereby enhance the performances of trapping solid components contained in fluid. In general, since the trapping layers are thin layers formed on the partition portions, it is difficult to evaluate pores in the trapping layers by pore distribution measurement using gas absorption measurement or by pore distribution measurement using mercury porosimetry. Herein, the median pore diameters D50 and D80 in the inscribed-circle-diameter distribution in the trapping layers are determined from maximum inscribed circles individually inscribed in a plurality of pore regions in SEM images. Use of this method probably allows for direct analysis of pores, compared with indirect measurements using certain media, for example, in gas absorption and mercury porosimetry. In addition, by making the median pore diameters D50 and D80 and the inscribed-circle porosity in the inscribed-circle-diameter distribution that are obtained from SEM images satisfy suitable ranges, the performances of trapping solid components contained in fluid can be further enhanced: for example, the pressure loss is reduced and a decrease in the trapping efficiency is suppressed, compared with existing techniques.

It is apparent that the present invention is not limited to the above-described embodiment at all and various embodiments can be made within the technical scope of the present invention.

Figure 5:
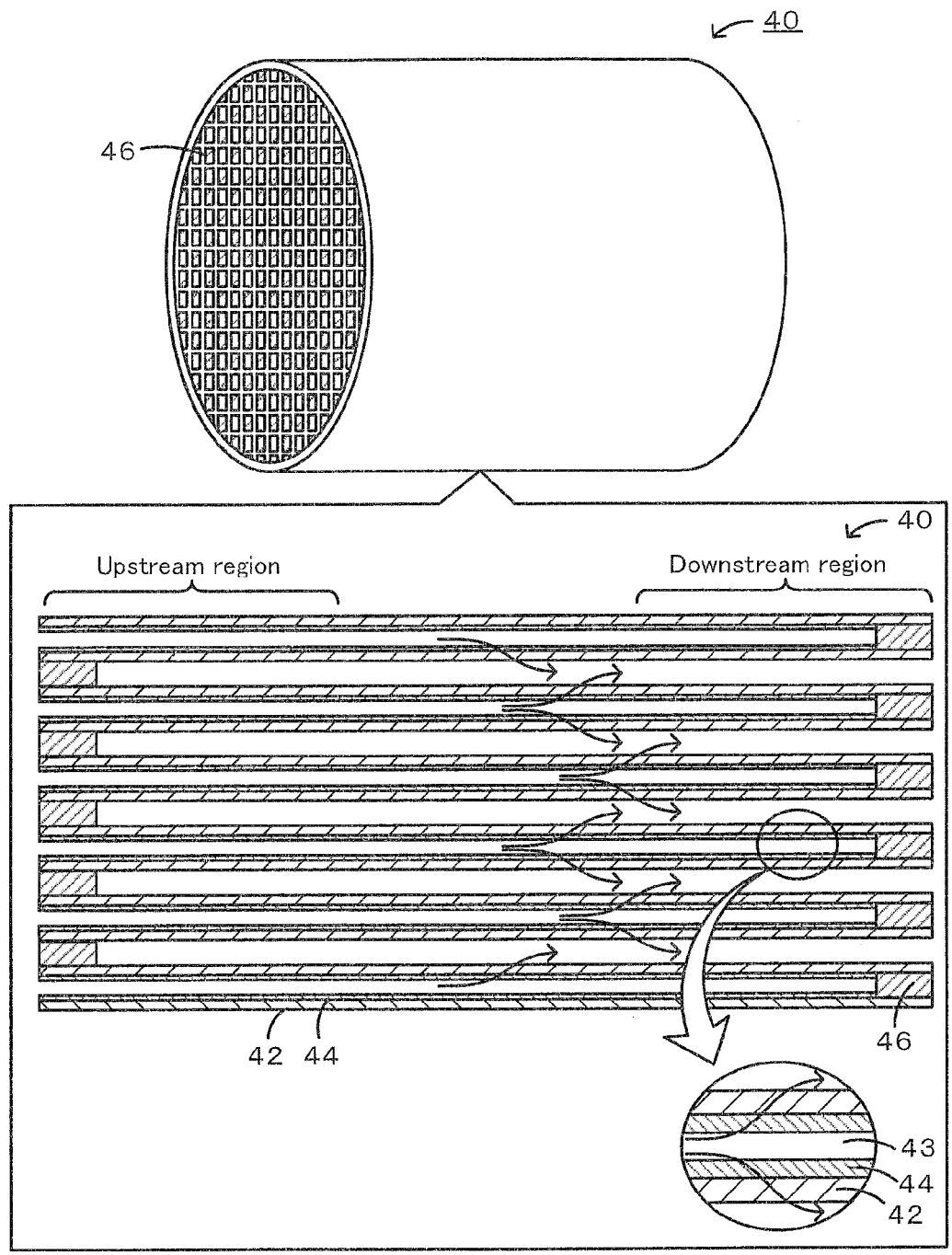
FIG. 5 is an explanatory view illustrating a schematic example of the configuration of an integrally formed honeycomb filter 40.

For example, in the above-described embodiment, the honeycomb segments 21 are bonded together with the bonding layers 27 to constitute the honeycomb filter 20. Alternatively, as illustrated in FIG. 5, an integrally formed honeycomb filter 40 may be employed. In the honeycomb filter 40, partition portions 42, cells 43, trapping layers 44, sealing portions 46, and the like may have configurations similar to those of the partition portions 22, the cells 23, the trapping layers 24, the sealing portions 26, and the like of the honeycomb filter 20. When the honeycomb filter 40 is employed, the performance of trapping and removing PM contained in exhaust gas can also be further enhanced.

In the above-described embodiment, the honeycomb filter 20 contains a catalyst. However, this is not particularly limitative as long as a substance that is contained in flowing fluid and intended to be removed can be cleaned. The honeycomb filter 20 may be provided without containing catalysts. The honeycomb filter 20 for trapping PM contained in exhaust gas has been described. However, this is not particularly limitative as long as a honeycomb filter for trapping and removing solid components contained in fluid is employed. A honeycomb filter for a power engine of construction machinery may be provided. Alternatively, a honeycomb filter for a plant or a power plant may be provided.

EXAMPLES

Hereinafter, examples in which honeycomb filters were specifically produced will be described as experimental examples. Herein, the produced honeycomb filters had a structure in which a plurality of honeycomb segments were bonded together.

[Production of Honeycomb Filter]

A SiC powder and a metal Si powder were mixed at a mass ratio of 80:20. Methylcellulose, hydroxypropoxylmethylcellulose, a surfactant, and water were added to the mixture and the resultant mixture was kneaded to prepare a plastic pug. This pug was extruded with a predetermined die to form honeycomb segment formed bodies having a desired shape. Herein, the formed shape was as follows: the thickness of the partition portions was 305 µm; the cell pitch was 1.47 mm; the cross section was 35 mm×35 mm; and the length was 152 mm. The obtained honeycomb segment formed bodies were then dried with microwaves, further dried with hot air, subsequently sealed, calcined in an oxidizing atmosphere at 550° C. for 3 hours, and subsequently fired in an inert atmosphere at 1400° C. for 2 hours. The sealing portions were formed by alternately masking cell openings in an end surface of each segment formed body and immersing the masked end surface into a sealing slurry containing a SiC raw material so that openings and sealing portions were alternately arranged. Similarly, a mask was formed on the other end surface and the sealing portions were formed such that a cell having one end open and the other end sealed and a cell having one end sealed and the other end open were alternately arranged. The air containing SiC particles having an average particle size smaller than the average pore diameter of the partitions was made to flow from the opening end portions on the exhaust-gas entry side of the resultant honeycomb segment fired body while the air was suctioned from the exit side of the honeycomb segment to thereby deposit the SiC particles on the surfaces of the partitions on the exhaust-gas entry side. At this time, a pore distribution adjustment treatment described below for trapping layers was performed so that trapping layers in which pore distributions were adjusted in the upstream and downstream regions of the honeycomb filter were formed on the partition portions. A heat treatment was subsequently performed in the air atmosphere at 1300° C. for 2 hours so that the SiC particles deposited on the surfaces of the partitions were bonded together and the deposited SiC particles and SiC and Si particles forming the partitions were bonded together. Thus, honeycomb segments in which the trapping layers were formed on the partition portions were prepared. Side surfaces of the thus-prepared honeycomb segments were coated with a bonding slurry prepared by kneading alumina silicate fibers, colloidal silica, polyvinyl alcohol, SiC, and water. These honeycomb segments were combined together, bonded under pressure, and then dried by heating. Thus, a honeycomb segment assembly whose whole shape is a rectangular prism shape was obtained. The honeycomb segment assembly was ground so as to have a cylindrical shape. The circumference of the assembly was then covered with a circumference coating slurry composed of the same material as that of the bonding slurry. The slurry was cured by being dried to thereby provide a cylindrical honeycomb filter having a desired shape, a desired segment shape, and a desired cell structure. Herein, the honeycomb filter had a shape in which the diameter of a cross section was 144 mm, the length was 152 mm, the thickness of the partition portions was 300 μm, and the cell pitch was 1.47 mm. In Experimental examples 1 to 58 described below, an inscribed-circle porosity determined from inscribed-circle-diameter distributions in partition portions was 40 vol % and the average pore diameter was 14 μm. In Experimental examples 59 to 61 described below, inscribed-circle porosities determined from inscribed-circle-diameter distributions in partition portions were respectively 60 vol %, 50 vol %, and 50 vol % and the pore diameters were respectively 25 μm, 25 μm, and 15 μm. The porosity and pore diameter of the trapping layers, which will be described below in detail, denote values of an inscribed-circle-diameter distribution obtained from images of partition portions captured with an electron microscope. The porosity and the average pore diameter of partition portions were measured with a mercury porosimeter (manufactured by Micromeritics Instrument Corporation, Auto Pore III type 9405). The average particle size of the raw-material particles of the trapping layers was the median diameter (D50) measured with a laser diffraction/scattering particle size distribution analyzer (LA-910 manufactured by HORIBA, Ltd.) and with water serving as a dispersion medium.

[Pore Distribution Adjustment Treatment for Trapping Layers]

The SiC particles forming the particle group of the trapping layers were supplied together with the air to each honeycomb segment to thereby deposit the SiC particles on the partition portions. At this time, by properly determining conditions including the average particle size and particle size distribution of the SiC particles, the amount of the SiC particles added, and the feed rate of the air, the porosity, the pore diameter, and the like of the trapping layers formed on the partition portions can be controlled. By making predetermined regions of the partition portions such as the upstream and downstream regions of the honeycomb segment contain alcohol, water, a resin, or the like to increase the permeation resistance to the air, regions where the SiC particles supplied are deposited can be controlled. For example, the average particle size of the SiC particles was made 2.3 μm to 10 the sharpness index Ds of the particle size distribution of SiC particles was made 0.7 to 1.8, and the flow rate of the air was made 160 L/min to 720 L/min. In the film formation of the downstream region, regions other than the downstream region were made to absorb water. After the film formation in the downstream region, the downstream region was covered with resin and a film was formed in the regions other than the downstream region. In this way, the porosity and pore diameter were controlled for regions of the trapping layers. The sharpness index Ds indicates the sharpness of the particle size distribution of SiC particles having a predetermined average particle size (for example, 5 μm). The sharpness index Ds is defined as being calculated with Ds=D50/(D90−D10) where the median diameters D10, D50, and D90 of the raw-material powder are measured by a laser diffraction/scattering particle size distribution analyzer.

[Catalyst Loading]

A slurry of a catalyst containing water as a medium was first prepared by mixing a raw material in which alumina: platinum:ceria-based material=7:0.5:2.5 by weight was satisfied and the ceria-based material satisfied Ce:Zr:Pr:Y: Mn=60:20:10:5:5 by weight. The exit end surface (from which exhaust gas flows out) of the honeycomb segment was then immersed to a predetermined height in the slurry while suction from the entry end surface (into which exhaust gas flows) was performed so as to be adjusted to a predetermined suction pressure and a predetermined suction rate for a predetermined time. Thus, the partitions were loaded with the catalyst. The honeycomb segment was dried at 120° C. for 2 hours and then baked at 550° C. for an hour. The amount of the catalyst per unit volume of the honeycomb filter was made to be 45 g/L.

(Capturing Images with SEM)

Figure 6:
FIG. 6 illustrates SEM images of the surface of the partition portion only and the surfaces of the partition portions in the upstream and downstream regions.
Figure 6:
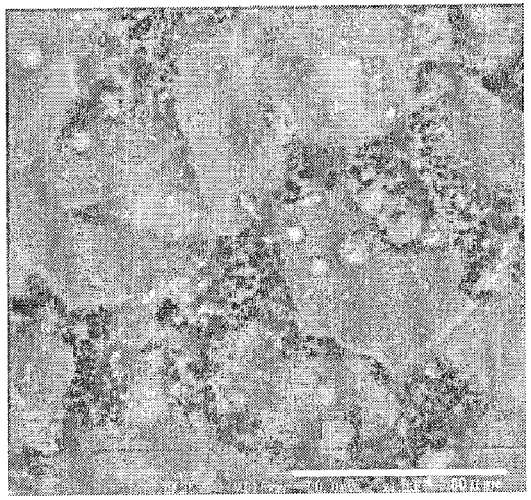
Figure 6:
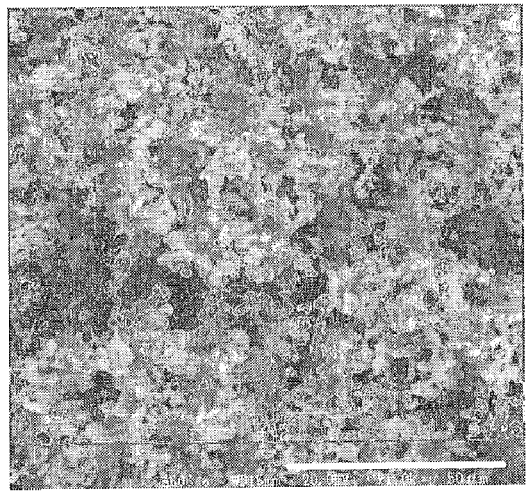
Figure 7:
FIG. 7 is an explanatory view of determining the inscribed-circle-diameter distributions with SEM images.
Figure 7:
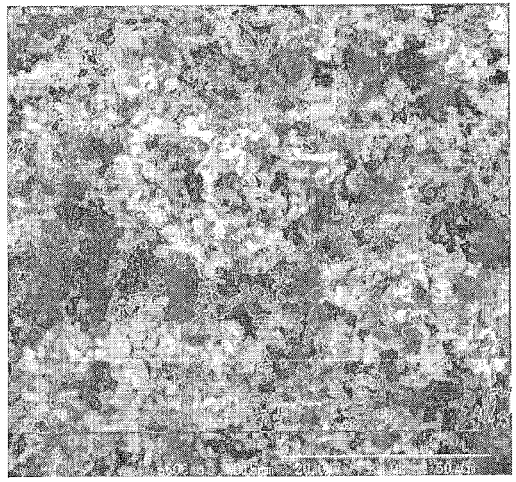
Figure 7:
Figure 7:
Figure 7:
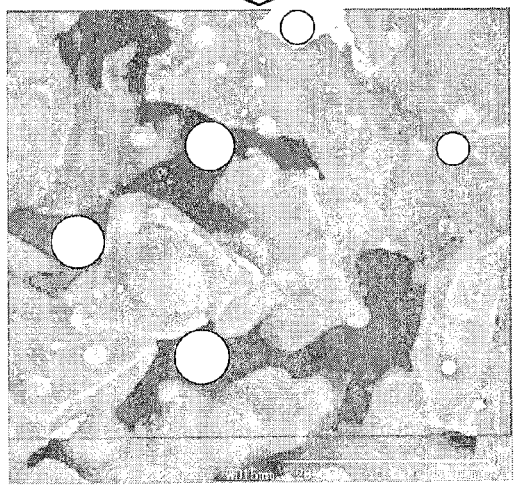
Figure 7:
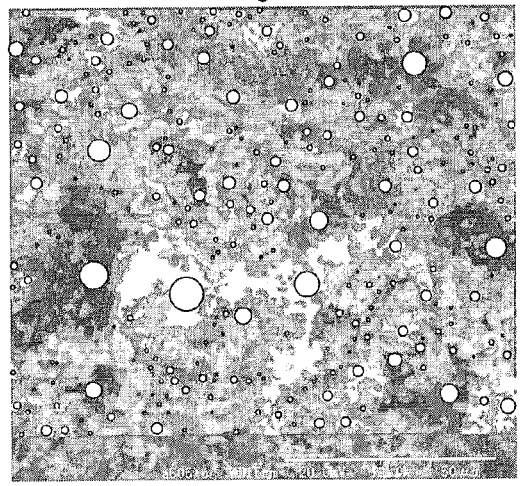

SEM images of cross sections of the produced honeycomb filter were captured with a scanning electron microscope (LA-910 manufactured by HORIBA, Ltd.). FIG. 6 illustrates SEM images of the surface of the partition portion only and the surfaces of the partition portions in the upstream and downstream regions. FIG. 7 is an explanatory view of determining the inscribed-circle-diameter distributions of the surface of the partition portion and the surface of the trapping layer with SEM images. As illustrated in FIG. 2, specimens for SEM-image capturing were prepared in the following manner. The honeycomb filter was cut to provide a cross section, at a portion that was away from the downstream end surface of the honeycomb filter by a certain proportion (15% to 55%, mainly 35%) of the entire length of the honeycomb filter. Three observation specimens having sides of about 1 cm were cut from the central portion of the cross section and polished. At this time, the specimens were cut out such that the cross sections thereof were horizontal to the partition portion. SEM images of five fields of view randomly selected in each of the sampled specimens were then captured (refer to FIG. 6 and the upper portion of FIG. 7). The SEM images were captured at a magnification of 1,000 times and saved as images of 1024×960 pixels. In total, 15 SEM images were captured from five fields of view in terms of three specimens sampled. The SEM images were subjected to image analysis described below to measure median pore diameters and porosity. The averages of the measured values were defined as values in the downstream region. Herein, a median pore diameter D50 (μm) obtained from the inscribed-circle-diameter distribution of the trapping layers, a median pore diameter D80 (μm) of the trapping layers, and an inscribed-circle porosity (area %) of the trapping layers were determined. The image analysis method will be described below. As for the upstream region, in the same manner as in the downstream region, observation specimens were obtained by cutting the honeycomb filter to provide a cross section, at a portion that was away from the upstream end surface of the honeycomb filter by 20% of the entire length of the honeycomb filter; the observation specimens were observed with the SEM and the inscribed-circle porosity (area %) of the trapping layers was determined from the obtained. SEM images. In the capture of the SEM images, the contrast and the brightness were in the ranges of contrast and brightness recommended for the scanning electron microscope (LA-910 manufactured by HORIBA, Ltd.). As a result, the binarization of image analysis described below was not substantially affected in the SEM images.

(Inscribed-Circle-Diameter Distribution)

An image captured from the partition portion with the electron microscope was divided into a material region and a plurality of pore regions. An inscribed-circle-diameter distribution was obtained with maximum inscribed circles individually inscribed in the pore regions. From the inscribed-circle-diameter distribution, the median pore diameter D50, the median pore diameter D80, and the inscribed-circle porosity were determined. The film-surface SEM image was subjected to binarization with image analysis software so as to be divided into a material region and pore regions (refer to the middle portion of FIG. 7). The threshold brightness serving as a boundary in binarization into the material region and the pore regions by image analysis was the 10th level among 0 to 255 brightness levels classified in 8 bits. Since the SEM image is a monochrome image, areas in which any one of RGB values was "10" or more in the 0-255 brightness levels were set as the material region and areas in which the RGB values were less than "10" were set as the pore regions. When the threshold was less than "10", the influences of small gaps other than pores between the particles, blurring of the image, and the like were strongly detected and hence it was difficult to properly evaluate the forms of the pores. When the threshold was more than "10", particularly in the cases of forming trapping layers, it sometimes became harder to sufficiently detect particles between pores and the pores tended to be recognized as a continuous single pore. Accordingly, the threshold was made "10". Among the pore regions determined by binarization, regions having a size of less than 50 pixels were excluded because they were considerably influenced by dust in SEM-image capture, slight cracking caused during polishing of resin, or the like; and regions having a size of 50 or more pixels were defined as the pore regions. A maximum circle was then drawn so as to be inscribed in each of the plurality of pore regions in the SEM image. The diameter, number, and the like of the maximum circles were determined. Although the pore regions had various shapes, a single maximum inscribed circle was drawn for each region (refer to the lower portion of FIG. 7). From this distribution, the median pore diameters D50 and D80 in the inscribed-circle-diameter distribution were calculated. The proportion of the integrated area of the maximum inscribed circles with respect to the total area of the observed fields of view was defined as the inscribed-circle porosity (area %).

Experimental Examples 1 to 5

A honeycomb filter was defined as Experimental example 1 in which the porosity and the pore diameter of the partition portions determined with a mercury porosimeter were respectively 40% and 14 µm, the inscribed-circle porosity determined from the inscribed-circle-diameter distribution in the trapping layers in the upstream region was 20%, the median pore diameter D50 determined from the inscribed-circle-diameter distribution in the trapping layers in the downstream region was 9 µm, the median pore diameter D80 in the trapping layers in the downstream region was 12 µm, and the inscribed-circle porosity in the trapping layers in the downstream region was 38%. In Experimental examples 1 to 34 and 46 to 55, the "downstream region" was a cross section that was away from the downstream end surface of the honeycomb filter by 35% of the entire length of the honeycomb filter. A honeycomb filter produced as in Experimental example 1 except that the median pore diameter D50 determined from the inscribed-circle-diameter distribution in the trapping layers in the downstream region was made 7 µm and the median pore diameter D80 in the trapping layers in the downstream region was made 11 µm was defined as Experimental example 2. A honeycomb filter produced as in Experimental example 2 except that the median pore diameter D50 in the trapping layers in the downstream region was made 5 µm was defined as Experimental example 3. A honeycomb filter produced as in Experimental example 2 except that the median pore diameter D50 in the trapping layers in the downstream region was made 3 µm was defined as Experimental example 4. A honeycomb filter produced as in Experimental example 2 except that the median pore diameter D50 in the trapping layers in the downstream region was made 1 µm was defined as Experimental example 5.

Experimental Examples 6 to 10

A honeycomb filter was defined as Experimental example 6 in which the inscribed-circle porosity and the pore diameter determined from the inscribed-circle-diameter distribution in the partition portions were respectively 40% and 14 µm, the inscribed-circle porosity determined from the inscribed-circle-diameter distribution in the trapping layers in the upstream region was 20%, the median pore diameter D50 determined from the inscribed-circle-diameter distribution in the trapping layers in the downstream region was 8 µm, the median pore diameter D80 in the trapping layers in the downstream region was 9 µm, and the inscribed-circle porosity in the trapping layers in the downstream region was 38%. A honeycomb filter produced as in Experimental example 6 except that the median pore diameter D50 was made 6 µm and the median pore diameter D80 was made 7 µm in the trapping layers in the downstream region was defined as Experimental example 7. A honeycomb filter produced as in Experimental example 6 except that the median pore diameter D50 was made 4 µm and the median pore diameter D80 was made 7 µm in the trapping layers in the downstream region was defined as Experimental example 8. A honeycomb filter produced as in Experimental example 6 except that the median pore diameter D50 was made 3 µm and the median pore diameter D80 was made 7 µm in the trapping layers in the downstream region was defined as Experimental example 9. A honeycomb filter produced as in Experimental example 6 except that the median pore diameter D50 was made 2 µm and the median pore diameter D80 was made 7 µm in the trapping layers in the downstream region was defined as Experimental example 10.

Thus, in Experimental examples 6 to 10, the median pore diameter D50 determined from the inscribed-circle-diameter distribution in the trapping layers in the downstream region was mainly adjusted. The pore distribution adjustment treatment performed will be described. The median pore diameter D50 was adjusted in the following manner. By making regions other than the downstream region absorb water, the permeation resistance of the regions other than the downstream region was first increased. The average particle size of the raw material of the trapping layers was then adjusted to be 4 µm to 10 and the air was supplied at a flow rate of 550 L/min. The raw material of the trapping layers was deposited in the downstream region such that the amount of the trapping layers formed in the downstream region, that is, the film-formation amount was adjusted to be 1.0 g/L. After that, the downstream region in which the film had been formed was coated with resin and film formation was performed in the upstream region with trapping-layer raw-material particles (average particle size: 5 μm) at a flow rate of 450 L/min so as to achieve 1.0 g/L. In addition to the raw-material average particle size (μm), the film-formation amount (g/L), and the air flow rate (L/min) in the downstream region, the resultant median pore diameter D50 (μm) in the downstream region under these conditions are summarized in Table 1. Thus, honeycomb filters in which the median pore diameter D50 in the downstream region is mainly adjusted to be various values can be obtained. In Experimental examples 1 to 5, the median pore diameter D50 was adjusted in the same manner.

TABLE 1

| No. | Trapping layer particle diameter (μm) | Film formation amount (g/L) | Air flow rate (L/min) | D50 (μm) |
|---|---|---|---|---|
| Experimental example6 | 10 | 1.0 | 550 | 8 |
| Experimental example7 | 8 | 1.0 | 550 | 6 |
| Experimental example8 | 6 | 1.0 | 550 | 4 |
| Experimental example9 | 5 | 1.0 | 550 | 3 |
| Experimental example10 | 4 | 1.0 | 550 | 2 |

Experimental Examples 11 to 16

A honeycomb filter produced as in Experimental example 6 except that the median pore diameter D50 was made 1 μm and the median pore diameter D80 was made 11 μm in the trapping layers in the downstream region was defined as Experimental example 11. A honeycomb filter produced as in Experimental example 6 except that the median pore diameter D50 was made 1 μm and the median pore diameter D80 was made 10 μm in the trapping layers in the downstream region was defined as Experimental example 12. A honeycomb filter produced as in Experimental example 6 except that the median pore diameter D50 was made 1 μm and the median pore diameter D80 was made 7 μm in the trapping layers in the downstream region was defined as Experimental example 13. A honeycomb filter produced as in Experimental example 6 except that the median pore diameter D50 was made 1 μm and the median pore diameter D80 was made 6 μm in the trapping layers in the downstream region was defined as Experimental example 14. A honeycomb filter produced as in Experimental example 6 except that the median pore diameter D50 was made 1 μm and the median pore diameter D80 was made 4 μm in the trapping layers in the downstream region was defined as Experimental example 15. A honeycomb filter produced as in Experimental example 6 except that the median pore diameter D50 was made 0.5 μm and the median pore diameter D80 was made 3 μm in the trapping layers in the downstream region was defined as Experimental example 16.

Experimental Examples 17 to 23

A honeycomb filter was defined as Experimental example 17 in which the inscribed-circle porosity and the pore diameter determined from the inscribed-circle-diameter distribution in the partition portions were respectively 40% and 14 μm, the inscribed-circle porosity determined from the inscribed-circle-diameter distribution in the trapping layers in the upstream region was 20%, the median pore diameter D50 determined from the inscribed-circle-diameter distribution in the trapping layers in the downstream region was 3 the median pore diameter D80 in the trapping layers in the downstream region was 9 μm, and the inscribed-circle porosity in the trapping layers in the downstream region was 38%. A honeycomb filter produced as in Experimental example 17 except that the median pore diameter D50 was made 3 μm and the median pore diameter D80 was made 7 μm in the trapping layers in the downstream region was defined as Experimental example 18. A honeycomb filter produced as in Experimental example 17 except that the median pore diameter D50 was made 3 μm and the median pore diameter D80 was made 5 μm in the trapping layers in the downstream region was defined as Experimental example 19. A honeycomb filter produced as in Experimental example 17 except that the median pore diameter D50 was made 2 μm and the median pore diameter D80 was made 3 μm in the trapping layers in the downstream region was defined as Experimental example 20. A honeycomb filter produced as in Experimental example 17 except that the median pore diameter D50 was made 1 μl and the median pore diameter D80 was made 2 μm in the trapping layers in the downstream region was defined as Experimental example 21. A honeycomb filter produced as in Experimental example 17 except that the median pore diameter D50 was made 0.5 μm and the median pore diameter D80 was made 1 μm in the trapping layers in the downstream region was defined as Experimental example 22. A honeycomb filter produced as in Experimental example 17 except that the median pore diameter D50 was made 0.3 μm and the median pore diameter D80 was made 0.5 μl in the trapping layers in the downstream region was defined as Experimental example 23.

Thus, in Experimental examples 11 to 23, the median pore diameter D80 determined from the inscribed-circle-diameter distribution in the trapping layers in the downstream region was mainly adjusted. The pore distribution adjustment treatment performed will be described. The median pore diameter D80 was adjusted by varying the sharpness index Ds of the particle size distribution of the raw material forming the trapping layers. By making regions other than the downstream region absorb water, the permeation resistance of the regions other than the downstream region was first increased. The sharpness index Ds of the raw material of the trapping layers was then adjusted to be 0.4 to 1.8 and the air was supplied at a flow rate of 600 L/min. The raw material of the trapping layers was deposited in the downstream region such that the amount of the trapping layers formed in the downstream region, that is, the film-formation amount was adjusted to be 1.0 g/L. At this time, in Experimental examples 11 to 16, trapping-layer raw-material particles having an average particle size of 3 were used in the downstream region; in Experimental examples 17 to 23, trapping-layer raw-material particles having an average particle size of 5 μm were used in the downstream region. After that, the downstream region in which the film had been formed was coated with resin and film formation was performed in the upstream region with trapping-layer raw-material particles having an average particle size of 5 μm (sharpness index Ds=0.2) at a flow rate of 450 L/min so as to achieve 1.0 g/L. In addition to the sharpness index Ds, the film-formation amount (g/L), and the air flow rate (L/min) in the downstream region, the resultant median pore diameter D80 (μm) in the downstream region under these conditions are summarized in Table 2. Thus, honeycomb filters in which the median pore diameter D80 in the downstream region is mainly adjusted to be various values can be obtained. In Experimental examples 1 to 10, the median pore diameter D80 was adjusted in the same manner.

In Experimental examples 6 to 10, a raw material satisfying sharpness index Ds=0.2 was also used.

TABLE 2

| No. | Sharpness index Ds [1] | Film formation amount (g/L) | Air flow rate (L/min) | D80 (μm) |
|---|---|---|---|---|
| Experimental example 11 | 0.4 | 1.0 | 600 | 11 |
| Experimental example 12 | 0.6 | 1.0 | 600 | 10 |
| Experimental example 13 | 1.0 | 1.0 | 600 | 7 |
| Experimental example 14 | 1.1 | 1.0 | 600 | 6 |
| Experimental example 15 | 1.4 | 1.0 | 600 | 4 |
| Experimental example 16 | 1.5 | 1.0 | 600 | 3 |
| Experimental example 17 | 0.5 | 1.0 | 600 | 9 |
| Experimental example 18 | 0.8 | 1.0 | 600 | 7 |
| Experimental example 19 | 1.0 | 1.0 | 600 | 5 |
| Experimental example 20 | 1.3 | 1.0 | 600 | 3 |
| Experimental example 21 | 1.5 | 1.0 | 600 | 2 |
| Experimental example 22 | 1.7 | 1.0 | 600 | 1 |
| Experimental example 23 | 1.8 | 1.0 | 600 | 0.5 |

[1] Sharpness index Ds = D50/(D90 − D10)

Experimental Examples 24 to 34

A honeycomb filter was defined as Experimental example 24 in which the inscribed-circle porosity and the pore diameter determined from the inscribed-circle-diameter distribution in the partition portions were respectively 40% and 14 μm, the inscribed-circle porosity determined from the inscribed-circle-diameter distribution in the trapping layers in the upstream region was 20%, the median pore diameter D50 determined from the inscribed-circle-diameter distribution in the trapping layers in the downstream region was 3 μm, the median pore diameter D80 in the trapping layers in the downstream region was 4 μm, and the inscribed-circle porosity in the trapping layers in the downstream region was 30%. A honeycomb filter produced as in Experimental example 24 except that the inscribed-circle porosity in the trapping layers in the downstream region was made 32% was defined as Experimental example 25. A honeycomb filter produced as in Experimental example 24 except that the inscribed-circle porosity in the trapping layers in the downstream region was made 35% was defined as Experimental example 26. A honeycomb filter produced as in Experimental example 24 except that the inscribed-circle porosity in the trapping layers in the downstream region was made 37% was defined as Experimental example 27. A honeycomb filter produced as in Experimental example 24 except that the inscribed-circle porosity in the trapping layers in the downstream region was made 40% was defined as Experimental example 28. A honeycomb filter produced as in Experimental example 24 except that the inscribed-circle porosity in the trapping layers in the downstream region was made 50% was defined as Experimental example 29. A honeycomb filter produced as in Experimental example 24 except that the inscribed-circle porosity in the trapping layers in the downstream region was made 55% was defined as Experimental example 30. A honeycomb filter produced as in Experimental example 24 except that the inscribed-circle porosity in the trapping layers in the downstream region was made 58% was defined as Experimental example 31. A honeycomb filter produced as in Experimental example 24 except that the inscribed-circle porosity in the trapping layers in the downstream region was made 60% was defined as Experimental example 32. A honeycomb filter produced as in Experimental example 24 except that the inscribed-circle porosity in the trapping layers in the downstream region was made 62% was defined as Experimental example 33. A honeycomb filter produced as in Experimental example 24 except that the inscribed-circle porosity in the trapping layers in the downstream region was made 65% was defined as Experimental example 34.

Thus, in Experimental examples 24 to 34, the inscribed-circle porosity determined from the inscribed-circle-diameter distribution in the trapping layers in the downstream region was adjusted. The pore distribution adjustment treatment performed will be described. The inscribed-circle porosity was adjusted in the following manner: while the average particle size of the raw material for forming the trapping layers was fixed, the air flow rate in the film formation was controlled to thereby adjust the porosity of the trapping layers. The higher the flow rate is, the more densified the raw-material particles become and hence the lower the porosity becomes. The lower the flow rate is, the more slowly the particles are deposited and hence the higher the porosity becomes. By making regions other than the downstream region absorb water, the permeation resistance of the regions other than the downstream region was first increased. The trapping-layer raw-material particles (average particle size: 5 μm) were then deposited in the downstream region such that the air was adjusted to flow at a flow rate of 160 L/min to 720 L/min and the amount of the trapping layers formed in the downstream region, that is, the film-formation amount was adjusted to be 1.0 g/L. After that, the downstream region in which the film had been formed was coated with resin and film formation was performed in the upstream region with trapping-layer raw-material particles (average particle size: 5 μm) at a flow rate of 450 L/min so as to achieve 1.0 g/L. In addition to the raw-material particle size (μm), the film-formation amount (g/L), and the air flow rate (L/min) in the downstream region, the resultant inscribed-circle porosity (%) in the downstream region under these conditions are summarized in Table 3. Thus, honeycomb filters in which only the inscribed-circle porosity in the downstream region is adjusted to be various values can be obtained.

TABLE 3

| No. | Trapping layer particle diameter (μm) | Film formation amount (g/L) | Air flow rate (L/min) | Porosity (%) |
|---|---|---|---|---|
| Experimental example 24 | 5 | 1.0 | 720 | 30 |
| Experimental example 25 | 5 | 1.0 | 680 | 32 |
| Experimental example 26 | 5 | 1.0 | 640 | 35 |
| Experimental example 27 | 5 | 1.0 | 600 | 37 |
| Experimental example 28 | 5 | 1.0 | 550 | 40 |
| Experimental example 29 | 5 | 1.0 | 390 | 50 |
| Experimental example 30 | 5 | 1.0 | 310 | 55 |
| Experimental example 31 | 5 | 1.0 | 260 | 58 |

TABLE 3-continued

| No. | Trapping layer particle diameter (μm) | Film formation amount (g/L) | Air flow rate (L/min) | Porosity (%) |
|---|---|---|---|---|
| Experimental example 32 | 5 | 1.0 | 220 | 60 |
| Experimental example 33 | 5 | 1.0 | 190 | 62 |
| Experimental example 34 | 5 | 1.0 | 160 | 65 |

Experimental Examples 35 to 45

A honeycomb filter was defined as Experimental example 35 in which the inscribed-circle porosity and the pore diameter determined from the inscribed-circle-diameter distribution in the partition portions were respectively 40% and 14 μm, the inscribed-circle porosity determined from the inscribed-circle-diameter distribution in the trapping layers in the upstream region was 20%, the median pore diameter D50 determined from the inscribed-circle-diameter distribution in the trapping layers in the downstream region was 3 μm, the median pore diameter D80 in the trapping layers in the downstream region was 4 μm, the inscribed-circle porosity in the trapping layers in the downstream region was 38%, and the "predetermined trapping region" extended from the downstream end surface of the honeycomb filter to a cross section that was away from the downstream end surface by 15% of the entire length of the honeycomb filter. The "predetermined trapping region" satisfies that, in an inscribed-circle-diameter distribution, a median pore diameter D50 is 1 μm or more and 6 μm or less, a median pore diameter D80 is 1 μm or more and 7 μm or less, and an inscribed-circle porosity is 35% or more and 60% or less. A honeycomb filter produced such that the "predetermined trapping region" extended from the downstream end surface of the honeycomb filter to a cross section that was away from the downstream end surface by 18% of the entire length of the honeycomb filter was defined as Experimental example 36. A honeycomb filter produced such that the "predetermined trapping region" extended from the downstream end surface of the honeycomb filter to a cross section that was away from the downstream end surface by 20% of the entire length of the honeycomb filter was defined as Experimental example 37. A honeycomb filter produced such that the "predetermined trapping region" extended from the downstream end surface of the honeycomb filter to a cross section that was away from the downstream end surface by 25% of the entire length of the honeycomb filter was defined as Experimental example 38. A honeycomb filter produced such that the "predetermined trapping region" extended from the downstream end surface of the honeycomb filter to a cross section that was away from the downstream end surface by 30% of the entire length of the honeycomb filter was defined as Experimental example 39. A honeycomb filter produced such that the "predetermined trapping region" extended from the downstream end surface of the honeycomb filter to a cross section that was away from the downstream end surface by 35% of the entire length of the honeycomb filter was defined as Experimental example 40. A honeycomb filter produced such that the "predetermined trapping region" extended from the downstream end surface of the honeycomb filter to a cross section that was away from the downstream end surface by 40% of the entire length of the honeycomb filter was defined as Experimental example 41. A honeycomb filter produced such that the "predetermined trapping region" extended from the downstream end surface of the honeycomb filter to a cross section that was away from the downstream end surface by 45% of the entire length of the honeycomb filter was defined as Experimental example 42. A honeycomb filter produced such that the "predetermined trapping region" extended from the downstream end surface of the honeycomb filter to a cross section that was away from the downstream end surface by 50% of the entire length of the honeycomb filter was defined as Experimental example 43. A honeycomb filter produced such that the "predetermined trapping region" extended from the downstream end surface of the honeycomb filter to a cross section that was away from the downstream end surface by 52% of the entire length of the honeycomb filter was defined as Experimental example 44. A honeycomb filter produced such that the "predetermined trapping region" extended from the downstream end surface of the honeycomb filter to a cross section that was away from the downstream end surface by 55% of the entire length of the honeycomb filter was defined as Experimental example 45.

Thus, in Experimental examples 35 to 45, the range of the "predetermined trapping region" was adjusted. The range of this downstream region was controlled by adjusting the height of the water-absorption and resin-coating region in the above-described first and second film formation. Specifically, in making regions other than the downstream region absorb water, when the downstream region is made to extend from the downstream end surface to a portion that is away from the downstream end surface by 15% of the entire length, regions other than this region are made to absorb water (first time). Subsequently, when the downstream region is made to extend from the downstream end surface to the portion that is away from the downstream end surface by 15% of the entire length, this region is coated with resin. In this way, the range of the "predetermined trapping region" can be adjusted.

Experimental Examples 46 to 52

A honeycomb filter was defined as Experimental example 46 in which the inscribed-circle porosity and the pore diameter determined from the inscribed-circle-diameter distribution in the partition portions were respectively 40% and 14 μm, the inscribed-circle porosity determined from the inscribed-circle-diameter distribution in the trapping layers in the upstream region was 10%, the median pore diameter D50 determined from the inscribed-circle-diameter distribution in the trapping layers in the downstream region was 3 μm, the median pore diameter D80 in the trapping layers in the downstream region was 4 μm, and the inscribed-circle porosity in the trapping layers in the downstream region was 38%. A honeycomb filter produced as in Experimental example 46 except that the inscribed-circle porosity determined from the inscribed-circle-diameter distribution in the trapping layers in the upstream region was made 15% was defined as Experimental example 47. A honeycomb filter produced as in Experimental example 46 except that the inscribed-circle porosity determined from the inscribed-circle-diameter distribution in the trapping layers in the upstream region was made 25% was defined as Experimental example 48. A honeycomb filter produced as in Experimental example 46 except that the inscribed-circle porosity determined from the inscribed-circle-diameter distribution in the trapping layers in the upstream region was made 30% was defined as Experimental example 49. A honeycomb filter produced as in Experimental example 46 except that the inscribed-circle porosity determined from the inscribed-circle-diameter distribution in the trapping layers in the upstream region was made 35% was defined as Experimental example 50. A honeycomb filter produced as in Experimental example 46 except that the inscribed-circle porosity determined from the inscribed-circle-diameter distribution in the trapping layers in the upstream region was made 40% was defined as Experimental example 51. A honeycomb filter produced as in Experimental example 46 except that the inscribed-circle porosity determined from the inscribed-circle-diameter distribution in the trapping layers in the upstream region was made 45% was defined as Experimental example 52. The inscribed-circle porosity determined from the inscribed-circle-diameter distribution in the trapping layers in the upstream region was adjusted by applying the same manner as in Experimental examples 24 to 34 to the formation of the trapping layers in the upstream region.

Experimental examples 53 to 55

A honeycomb filter was defined as Experimental example 53 in which the inscribed-circle porosity and the pore diameter of the partition portions determined with a mercury porosimeter were respectively 60% and 25 μm, the inscribed-circle porosity determined from the inscribed-circle-diameter distribution in the trapping layers in the upstream region was 20%, the median pore diameter D50 determined from the inscribed-circle-diameter distribution in the trapping layers in the downstream region was 3 μm, the median pore diameter D80 in the trapping layers in the downstream region was 4 μm, and the inscribed-circle porosity in the trapping layers in the downstream region was 38%. A honeycomb filter produced as in Experimental example 53 except that the porosity and the pore diameter of the partition portions were respectively made 50% and 25 μm was defined as Experimental example 54. A honeycomb filter produced as in Experimental example 53 except that the porosity and the pore diameter of the partition portions were respectively made 50% and 15 μm was defined as Experimental example 55. The porosity and the pore diameter of the partition portions can be adjusted by changing the particle size and amount of a pore-forming agent added in the preparation of the honeycomb segments.

(Pressure Loss Test)
Each of the honeycomb filters produced above was installed in a position directly below a 2.0-L diesel engine. The engine was stabilized in the idle state and then instantly brought to a state of 4000 rpm and 200 Nm. At this time, the pressure loss behavior of the honeycomb filter was measured and the maximum pressure loss measured was defined as the pressure loss of the measured filter.

(Trapping Efficiency)
The smoke numbers were measured upstream and downstream of the honeycomb filter in the measurement of the pressure loss test. The ratio of trapping smoke due to passing through the honeycomb filter with respect to the smoke number at the entrance of the honeycomb filter was defined as the measured trapping efficiency. A device for measuring the smoke numbers was a smoke meter AVL 415S manufactured by AVL.

Figure 8:
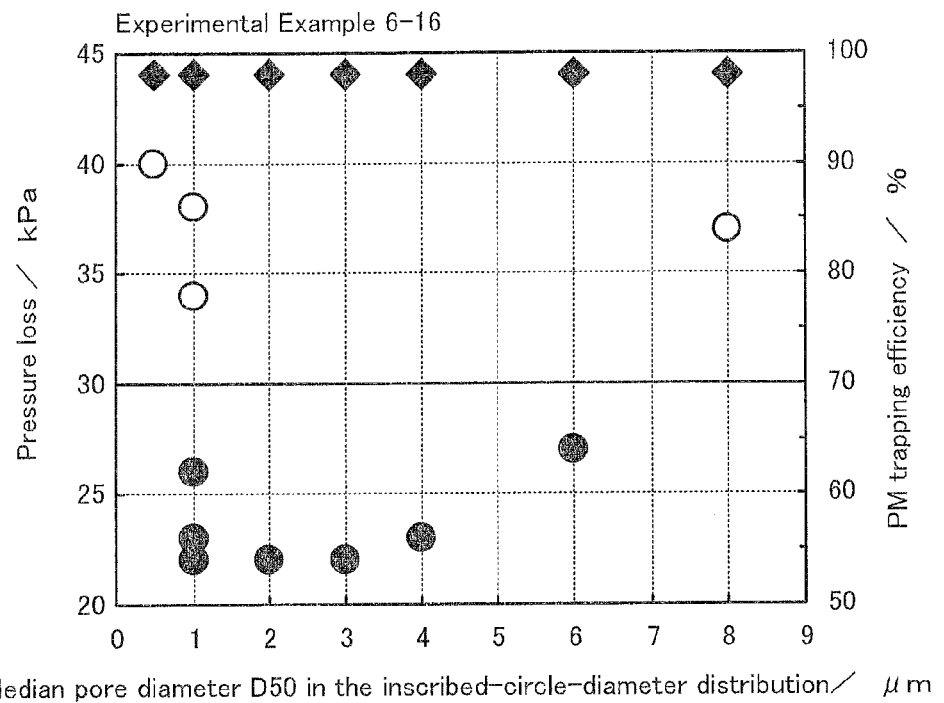
FIG. 8 is a graph in terms of pressure loss, PM trapping efficiency, and median pore diameter D50 in the inscribed-circle-diameter distribution in Experimental examples 6 to 16.
Figure 9:
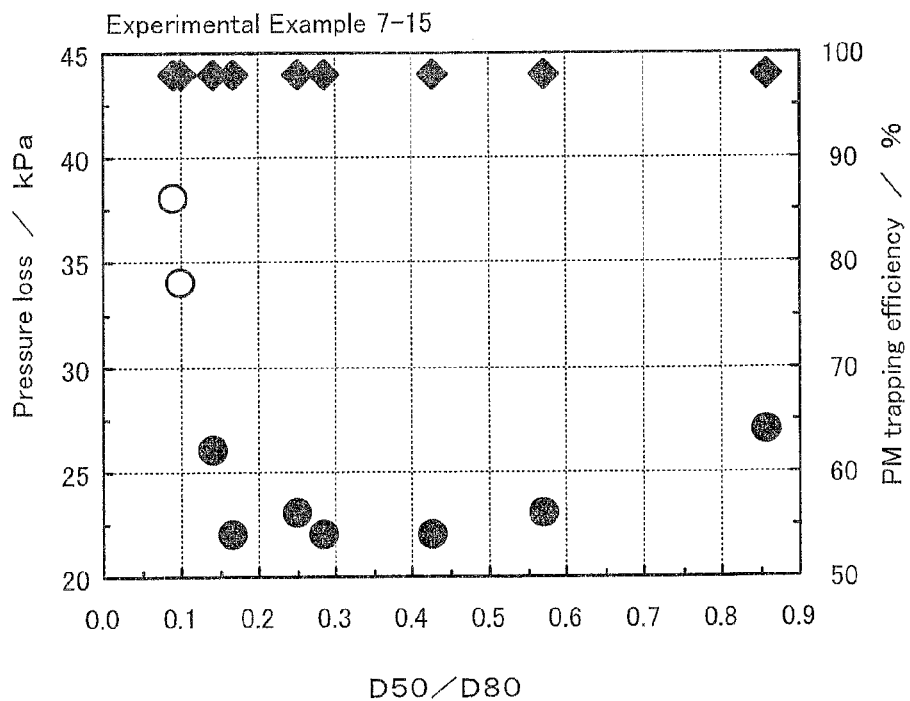
FIG. 9 is a graph in terms of pressure loss, PM trapping efficiency, and D50/D80 in Experimental examples 7 to 15.
Figure 10:
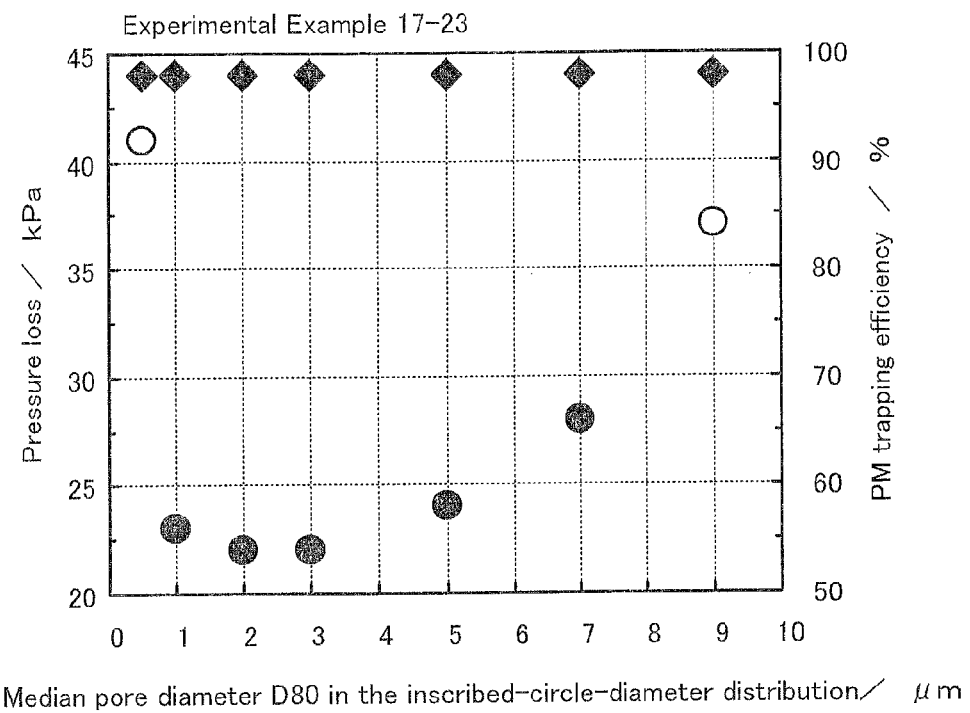
FIG. 10 is a graph in terms of pressure loss, PM trapping efficiency, and median pore diameter D80 in the inscribed-circle-diameter distribution in Experimental examples 17 to 23.
Figure 11:
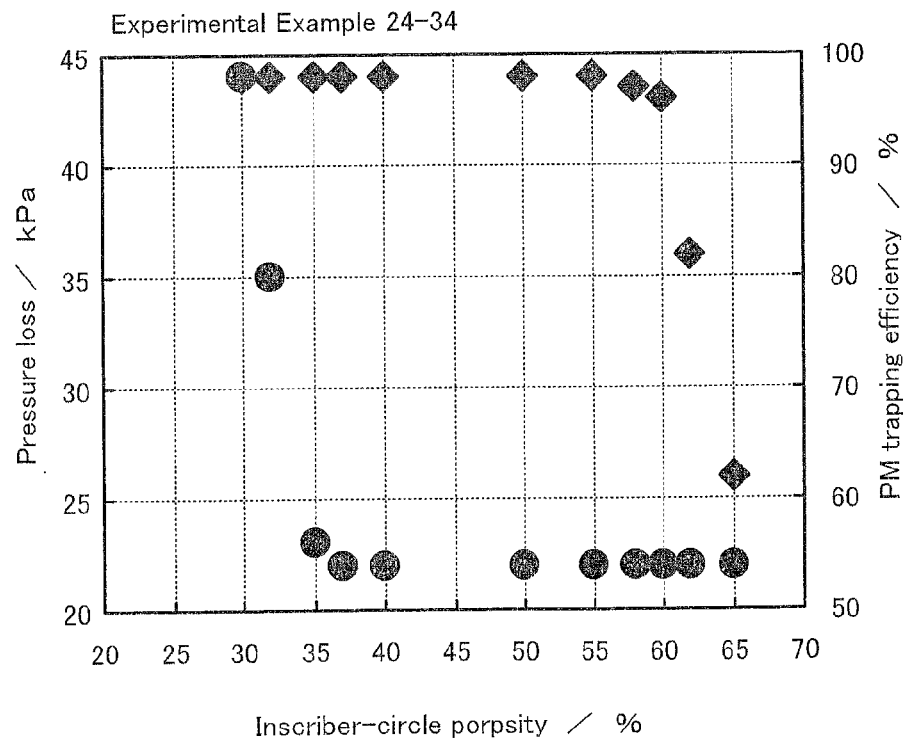
FIG. 11 is a graph in terms of pressure loss, PM trapping efficiency, and inscribed-circle porosity from the inscribed-circle-diameter distribution in the downstream region in Experimental examples 24 to 34.
Figure 12:
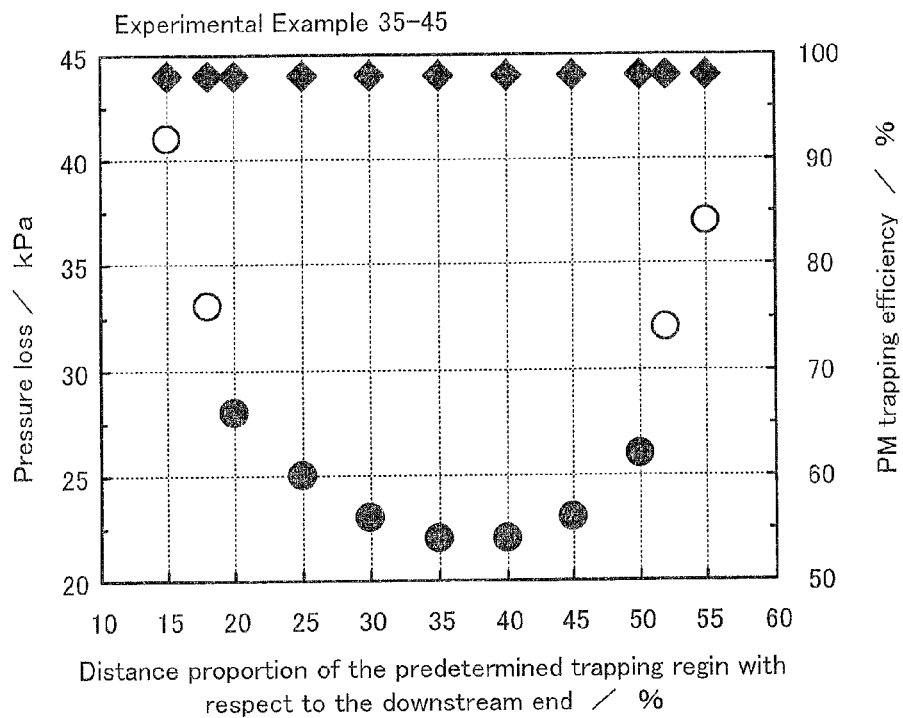
FIG. 12 is a graph in terms of pressure loss, PM trapping efficiency, and distance proportion of the predetermined trapping region with respect to the downstream end in Experimental examples 35 to 45.
Figure 13:
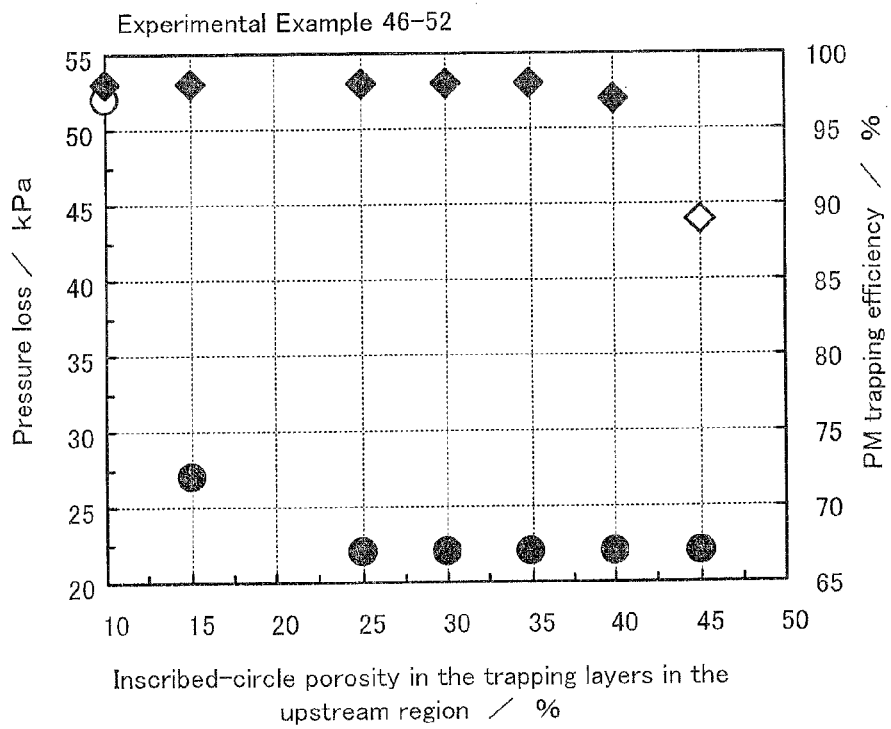
FIG. 13 is a graph in terms of pressure loss, PM trapping efficiency, and inscribed-circle porosity in the trapping layers in the upstream region in Experimental examples 46 to 52.

(Experimental Results)
The measurement results and the like of Experimental examples 1 to 34 are described in Table 4. The measurement results and the like of Experimental examples 35 to 55 are described in Table 5. FIG. 8 is a graph in terms of pressure loss, PM trapping efficiency, and median pore diameter D50 in the inscribed-circle-diameter distribution in Experimental examples 6 to 16. FIG. 9 is a graph in terms of pressure loss, PM trapping efficiency, and D50/D80 in Experimental examples 7 to 15. FIG. 10 is a graph in terms of pressure loss, PM trapping efficiency, and median pore diameter D80 in the inscribed-circle-diameter distribution in Experimental examples 17 to 23. FIG. 11 is a graph in terms of pressure loss, PM trapping efficiency, and inscribed-circle porosity in the inscribed-circle-diameter distribution in the downstream region in Experimental examples 24 to 34. FIG. 12 is a graph in terms of pressure loss, PM trapping efficiency, and distance proportion of the predetermined trapping region with respect to the downstream end in Experimental examples 35 to 45. FIG. 13 is a graph in terms of pressure loss, PM trapping efficiency, and inscribed-circle porosity in the trapping layers in the upstream region in Experimental examples 46 to 52.

TABLE 4

| No. | Base (Partition portion) Porosity [%] | Pore diameter [um] | Trapping layer Upstream Porosity [%] | Downstream D50 [um] | D80 [um] | D50/D80 [—] | Porosity [%] | Distance from downstream [%][1] | Pressure loss with deposited soot under high load [kPa] | Trapping efficiency [%] |
|---|---|---|---|---|---|---|---|---|---|---|
| Experimental example 1  | 40 | 14 | 20 | 9   | 12 | 0.8  | 38 | 35 | 38 | 98 |
| Experimental example 2  | 40 | 14 | 20 | 7   | 11 | 0.6  | 38 | 35 | 37 | 98 |
| Experimental example 3  | 40 | 14 | 20 | 5   | 11 | 0.5  | 38 | 35 | 38 | 98 |
| Experimental example 4  | 40 | 14 | 20 | 3   | 11 | 0.3  | 38 | 35 | 38 | 98 |
| Experimental example 5  | 40 | 14 | 20 | 1   | 11 | 0.1  | 38 | 35 | 37 | 98 |
| Experimental example 6  | 40 | 14 | 20 | 8   | 9  | 0.9  | 38 | 35 | 37 | 98 |
| Experimental example 7  | 40 | 14 | 20 | 6   | 7  | 0.9  | 38 | 35 | 27 | 98 |
| Experimental example 8  | 40 | 14 | 20 | 4   | 7  | 0.6  | 38 | 35 | 23 | 98 |
| Experimental example 9  | 40 | 14 | 20 | 3   | 7  | 0.4  | 38 | 35 | 22 | 98 |
| Experimental example 10 | 40 | 14 | 20 | 2   | 7  | 0.3  | 38 | 35 | 22 | 98 |
| Experimental example 11 | 40 | 14 | 20 | 1   | 11 | 0.09 | 38 | 35 | 38 | 98 |
| Experimental example 12 | 40 | 14 | 20 | 1   | 10 | 0.10 | 38 | 35 | 34 | 98 |
| Experimental example 13 | 40 | 14 | 20 | 1   | 7  | 0.14 | 38 | 35 | 26 | 98 |
| Experimental example 14 | 40 | 14 | 20 | 1   | 6  | 0.2  | 38 | 35 | 22 | 98 |
| Experimental example 15 | 40 | 14 | 20 | 1   | 4  | 0.3  | 38 | 35 | 23 | 98 |
| Experimental example 16 | 40 | 14 | 20 | 0.5 | 3  | 0.2  | 38 | 35 | 40 | 98 |
| Experimental example 17 | 40 | 14 | 20 | 3   | 9  | 0.3  | 38 | 35 | 37 | 98 |
| Experimental example 18 | 40 | 14 | 20 | 3   | 7  | 0.4  | 38 | 35 | 28 | 98 |
| Experimental example 19 | 40 | 14 | 20 | 3   | 5  | 0.6  | 38 | 35 | 24 | 98 |
| Experimental example 20 | 40 | 14 | 20 | 2   | 3  | 0.7  | 38 | 35 | 22 | 98 |
| Experimental example 21 | 40 | 14 | 20 | 1   | 2  | 0.5  | 38 | 35 | 22 | 98 |

TABLE 4-continued

| No. | Base (Partition portion) Porosity [%] | Base (Partition portion) Pore diameter [um] | Trapping layer Upstream Porosity [%] | Trapping layer Downstream D50 [um] | Trapping layer Downstream D80 [um] | Trapping layer Downstream D50/D80 [—] | Trapping layer Downstream Porosity [%] | Distance from downstream [1] [%] | Pressure loss with deposited soot under high load [kPa] | Trapping efficiency [%] |
|---|---|---|---|---|---|---|---|---|---|---|
| Experimental example 22 | 40 | 14 | 20 | 0.5 | 1 | 0.5 | 38 | 35 | 23 | 98 |
| Experimental example 23 | 40 | 14 | 20 | 0.3 | 0.5 | 0.6 | 38 | 35 | 41 | 98 |
| Experimental example 24 | 40 | 14 | 20 | 3 | 4 | 0.8 | 30 | 35 | 44 | 98 |
| Experimental example 25 | 40 | 14 | 20 | 3 | 4 | 0.8 | 32 | 35 | 35 | 98 |
| Experimental example 26 | 40 | 14 | 20 | 3 | 4 | 0.8 | 35 | 35 | 23 | 98 |
| Experimental example 27 | 40 | 14 | 20 | 3 | 4 | 0.8 | 37 | 35 | 22 | 98 |
| Experimental example 28 | 40 | 14 | 20 | 3 | 4 | 0.8 | 40 | 35 | 22 | 98 |
| Experimental example 29 | 40 | 14 | 20 | 3 | 4 | 0.8 | 50 | 35 | 22 | 98 |
| Experimental example 30 | 40 | 14 | 20 | 3 | 4 | 0.8 | 55 | 35 | 22 | 98 |
| Experimental example 31 | 40 | 14 | 20 | 3 | 4 | 0.8 | 58 | 35 | 22 | 97 |
| Experimental example 32 | 40 | 14 | 20 | 3 | 4 | 0.8 | 60 | 35 | 22 | 96 |
| Experimental example 33 | 40 | 14 | 20 | 3 | 4 | 0.8 | 62 | 35 | 22 | 82 |
| Experimental example 34 | 40 | 14 | 20 | 3 | 4 | 0.8 | 65 | 35 | 22 | 62 |

[1] A region satisfies 1 μm < D50 < 6 μm, 1 μm < D80 < 7 μm in the inscribed-circle-diameter distribution and 35% ≤ inscribed-circle porosity P ≤ 65%

TABLE 5

| No. | Base (Partition portion) Porosity [%] | Base (Partition portion) Pore diameter [um] | Trapping layer Upstream Porosity [%] | Trapping layer Downstream D50 [um] | Trapping layer Downstream D80 [um] | Trapping layer Downstream D50/D80 [—] | Trapping layer Downstream Porosity [%] | Distance from downstream [1] [%] | Pressure loss with deposited soot under high load [kPa] | Trapping efficiency [%] |
|---|---|---|---|---|---|---|---|---|---|---|
| Experimental example 35 | 40 | 14 | 20 | 3 | 4 | 0.8 | 38 | 15 | 41 | 98 |
| Experimental example 36 | 40 | 14 | 20 | 3 | 4 | 0.8 | 38 | 18 | 33 | 98 |
| Experimental example 37 | 40 | 14 | 20 | 3 | 4 | 0.8 | 38 | 20 | 28 | 98 |
| Experimental example 38 | 40 | 14 | 20 | 3 | 4 | 0.8 | 38 | 25 | 25 | 98 |
| Experimental example 39 | 40 | 14 | 20 | 3 | 4 | 0.8 | 38 | 30 | 23 | 98 |
| Experimental example 40 | 40 | 14 | 20 | 3 | 4 | 0.8 | 38 | 35 | 22 | 98 |
| Experimental example 41 | 40 | 14 | 20 | 3 | 4 | 0.8 | 38 | 40 | 22 | 98 |
| Experimental example 42 | 40 | 14 | 20 | 3 | 4 | 0.8 | 38 | 45 | 23 | 98 |
| Experimental example 43 | 40 | 14 | 20 | 3 | 4 | 0.8 | 38 | 50 | 26 | 98 |
| Experimental example 44 | 40 | 14 | 20 | 3 | 4 | 0.8 | 38 | 52 | 32 | 98 |
| Experimental example 45 | 40 | 14 | 20 | 3 | 4 | 0.8 | 38 | 55 | 37 | 98 |
| Experimental example 46 | 40 | 14 | 10 | 3 | 4 | 0.8 | 38 | 35 | 52 | 98 |
| Experimental example 47 | 40 | 14 | 15 | 3 | 4 | 0.8 | 38 | 35 | 27 | 98 |
| Experimental example 48 | 40 | 14 | 25 | 3 | 4 | 0.8 | 38 | 35 | 22 | 98 |
| Experimental example 49 | 40 | 14 | 30 | 3 | 4 | 0.8 | 38 | 35 | 22 | 98 |
| Experimental example 50 | 40 | 14 | 35 | 3 | 4 | 0.8 | 38 | 35 | 22 | 98 |
| Experimental example 51 | 40 | 14 | 40 | 3 | 4 | 0.8 | 38 | 35 | 22 | 97 |
| Experimental example 52 | 40 | 14 | 45 | 3 | 4 | 0.8 | 38 | 35 | 22 | 89 |
| Experimental example 53 | 60 | 25 | 20 | 3 | 4 | 0.8 | 38 | 35 | 22 | 98 |
| Experimental example 54 | 50 | 25 | 20 | 3 | 4 | 0.8 | 38 | 35 | 22 | 98 |
| Experimental example 55 | 50 | 15 | 20 | 3 | 4 | 0.8 | 38 | 35 | 22 | 98 |

[1] A region satisfies 1 μm < D50 < 6 μm, 1 μm < D80 < 7 μm in the inscribed-circle-diameter distribution and 35% ≤ inscribed-circle porosity P ≤ 65%

Tables 4 and 5 and FIGS. 7 to 13 indicate that, when the median pore diameter D50 in the inscribed-circle-diameter distribution was less than 1 μm, the pressure loss considerably increased. This is probably because the permeability of the trapping layers became excessively small. When the median pore diameter D50 in the inscribed-circle-diameter distribution was more than 6 μm, the pressure loss considerably increased. This is probably because, in particular, under a high load causing a high flow rate, soot passed through open pores in the trapping layers and deposited in the pores in the partition portions. When the median pore diameter D80 in the inscribed-circle-diameter distribution was less than 1 μm, the pressure loss considerably increased. This is probably because the permeability of the trapping layers became excessively small. When the median pore diameter D80 in the inscribed-circle-diameter distribution was more than 7 μm, the pressure loss considerably increased. This is probably because, in particular, under a high load causing a high flow rate, soot passed through open pores in the trapping layers and deposited in the pores in the partition portions. When the inscribed-circle porosity determined from the inscribed-circle-diameter distribution was less than 35%, the pressure loss considerably increased. This is probably because the permeation resistance became excessively high. When the inscribed-circle porosity determined from the inscribed-circle-diameter distribution was more than 60%, the trapping efficiency considerably decreased. This is probably because the trapping performance of the trapping layers was not sufficiently exhibited. In addition, it has been found that the ratio of the median pore diameter D50 to the median pore diameter D80, that is, D50/D80 preferably satisfies 0.1<D50/D80<1. This is probably because, when D50/D80 is more than 0.1, an increase in the pressure loss due to an increase in the closed pores can be suppressed.

When the distance proportion of the downstream region satisfying the preferred ranges (a predetermined trapping region according to the present invention) with respect to the downstream end surface was less than 20% of the entire length, the pressure loss considerably increased. This is probably because soot was not sufficiently trapped by the trapping layers and soot deposited in the pores in the bases. Regarding this respect, when properties do not vary in the entire-length direction, the permeation flow rate in the partition portions becomes the highest in the downstream region due to the balance between the permeation resistance and the inertial resistance. The pressure-loss property is governed by the property of the trapping layers in the downstream region. Thus, when the trapping layers are sufficiently formed in the downstream region, the pressure loss can be suppressed. Accordingly, when the distance proportion of the downstream region with respect to the downstream end surface is less than 20% of the entire length, the region at a high permeation flow rate cannot be sufficiently covered by the trapping layers, which probably results in a high pressure loss. When the distance proportion of the downstream region with respect to the downstream end surface was more than 50% of the entire length, the pressure loss considerably increased. This is probably because, in loading with a catalyst, the catalyst slurry does not sufficiently permeate the upstream region of the honeycomb filter; thus, the catalyst agglomerates within the trapping layers and in the interfacial portions between the trapping layers and the bases. Regarding this respect, when coating with the catalyst slurry is performed under suction, the downstream end surface of the honeycomb filter is brought into contact with a catalyst slurry pool and suctioning is performed in the upstream region. In this suctioning, when the permeation resistance in the upstream region becomes high, the flow rate in the suctioning needs to be made high. Accordingly, the suctioning flow rate in the downstream region also becomes high. Thus, a large amount of the catalyst slurry is probably deposited in the interfacial portions between the trapping layers and the partition portions and within the trapping layers, resulting in clogging of the pores.

Accordingly, it has been demonstrated that, in an inscribed-circle-diameter distribution obtained from an image captured with an electron microscope, when the median pore diameter D50 is 1 μm or more and 6 μm or less, a median pore diameter D80 is 1 μm or more and 7 μm or less, and an inscribed-circle porosity is 35% or more and 60% or less, performances of trapping PM contained in exhaust gas in terms of pressure loss, PM-trapping efficiency, and the like can be further enhanced. It has also been demonstrated that 0.1<D50/D80<1 is preferably satisfied; a region that extends from the downstream end surface of the honeycomb filter and has a length that is at least 20% of the entire length of the honeycomb filter is preferably the "predetermined trapping region"; and a region that extends from the downstream end surface and has a length of 50% or less of the entire length of the honeycomb filter is preferably the "predetermined trapping region". It has also been demonstrated that a region in which an inscribed-circle porosity determined from the inscribed-circle-diameter distribution is 15% or more and 40% or less is preferably present in an upstream region that extends from the upstream end surface and has a length that is 20% or less of the entire length.

The present application claims priority on the basis of the Japanese Patent Application No. 2011-75754 filed on Mar. 30, 2011, the entire contents of which are incorporated herein by reference.

What is claimed is:

1. A honeycomb filter comprising:
   a plurality of porous partition portions forming a plurality of cells serving as channels of fluid; and
   trapping layers that are formed on the partition portions and configured to trap a solid component contained in the fluid,
   wherein a predetermined trapping region present on the partition portions satisfies that, in an inscribed-circle-diameter distribution obtained by dividing an image of the partition portions captured with an electron microscope into a material region and a plurality of pore regions and by drawing maximum inscribed circles individually inscribed in the pore regions, a median pore diameter D50 is 1 μm or more and 6 μm or less and a median pore diameter D80 is 1 μm or more and 7 μm or less, and an inscribed-circle porosity determined from the inscribed-circle-diameter distribution is 35% or more and 60% or less.

2. The honeycomb filter according to claim 1, wherein the predetermined trapping region further satisfies 0.1<D50/D80<1.

3. The honeycomb filter according to claim 1, wherein, in the partition portions, the predetermined trapping region extends from a downstream end surface of the honeycomb filter and has a length that is at least 20% of an entire length of the honeycomb filter; and the predetermined trapping region extends from the downstream end surface and has a length that is 50% or less of the entire length of the honeycomb filter.

4. The honeycomb filter according to claim 1, wherein a region in which an inscribed-circle porosity determined from the inscribed-circle-diameter distribution is 15% or more and 40% or less is present in an upstream region that extends from an upstream end surface of the honeycomb filter and has a length that is 20% or less of an entire length of the honeycomb filter.

5. The honeycomb filter according to claim 1, wherein the trapping layers are formed by supplying an inorganic material serving as a raw material of the trapping layers to the cells with a gas serving as a transport medium.

6. The honeycomb filter according to claim 1, wherein the partition portions are formed so as to contain one or more inorganic materials selected from cordierite, SiC, mullite, aluminum titanate, alumina, silicon nitride, SIALON, zirconium phosphate, zirconia, titania, and silica.

7. The honeycomb filter according to claim 1, wherein the honeycomb filter includes two or more honeycomb segments bonded together with a bonding layer, the honeycomb segments including the partition portions and the trapping layers.

8. The honeycomb filter according to claim 1, wherein the honeycomb filter is loaded with a catalyst.

* * * * *